United States Patent
Shin et al.

(10) Patent No.: US 12,255,762 B2
(45) Date of Patent: Mar. 18, 2025

(54) METHOD AND DEVICE FOR TRANSMITTING AND RECEIVING SIGNALS IN WIRELESS COMMUNICATION SYSTEM

(71) Applicant: LG ELECTRONICS INC., Seoul (KR)

(72) Inventors: Seokmin Shin, Seoul (KR); Suckchel Yang, Seoul (KR); Seonwook Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 573 days.

(21) Appl. No.: 17/626,698

(22) PCT Filed: Aug. 14, 2020

(86) PCT No.: PCT/KR2020/095114
§ 371 (c)(1),
(2) Date: Jan. 12, 2022

(87) PCT Pub. No.: WO2021/029760
PCT Pub. Date: Feb. 18, 2021

(65) Prior Publication Data
US 2022/0263696 A1    Aug. 18, 2022

(30) Foreign Application Priority Data

Aug. 15, 2019 (KR) .................. 10-2019-0100013
Aug. 15, 2019 (KR) .................. 10-2019-0100016
Aug. 15, 2019 (KR) .................. 10-2019-0100017

(51) Int. Cl.
*H04L 27/26* (2006.01)
*H04L 5/00* (2006.01)
(Continued)

(52) U.S. Cl.
CPC ........ *H04L 27/2613* (2013.01); *H04L 5/0051* (2013.01); *H04L 27/2614* (2013.01);
(Continued)

(58) Field of Classification Search
None
See application file for complete search history.

(56) References Cited

U.S. PATENT DOCUMENTS 10,447,447 B2 * 10/2019 Namgoong ........... H04L 5/0007
11,095,411 B2 *  8/2021 Jiang ..................... H04W 72/21
(Continued)

FOREIGN PATENT DOCUMENTS

WO    2015/115819 A1    8/2015
WO    2017/026814 A1    2/2017
(Continued)

OTHER PUBLICATIONS

3GPP TSG RAN WG1 Meeting #94, "Enhancements to NR UL Signals and channels for unlicensed operation," Gothenburg, Sweden, Aug. 20-24, 2018, R1-1808684: Intel Corporation—Aug. 11, 2018 (13 Pages) (Year: 2018).*
(Continued)

*Primary Examiner* — Faiyazkhan Ghafoerkhan
(74) *Attorney, Agent, or Firm* — BRYAN CAVE LEIGHTON PAISNER LLP

(57) ABSTRACT

A method and device for transmitting and receiving signals in a wireless communication system, according to one embodiment of the present invention, comprise: repetitively mapping a PUCCH sequence to each of resource blocks (RB) in an interlace; and transmitting the PUCCH on the interlace, wherein the number of RBs constituting the interlace may be a prime number.

12 Claims, 42 Drawing Sheets

(51) Int. Cl.
*H04W 72/1268* (2023.01)
*H04W 74/00* (2009.01)
*H04W 74/0833* (2024.01)

(52) U.S. Cl.
CPC ..... *H04W 72/1268* (2013.01); *H04W 74/004* (2013.01); *H04W 74/0833* (2013.01)

(56) References Cited

U.S. PATENT DOCUMENTS

2015/0156638 A1* 6/2015 Yerramalli ............ H04L 5/0051
455/454
2017/0288837 A1* 10/2017 Namgoong ........... H04L 5/0007
2018/0048446 A1* 2/2018 Jiang .................... H04W 72/21
2022/0263696 A1* 8/2022 Shin ..................... H04L 5/0051

FOREIGN PATENT DOCUMENTS

WO 2017/171314 A1 10/2017
WO 2017/217799 A1 12/2017

OTHER PUBLICATIONS

3GPP TSG RAN WG1 Meeting #94, "Enhancements to NR UL Signals and channels fro unlicensed operation," Gothenburg, Sweden, Aug. 20-24, 2018, R1-1808684: Intel Corporation—Aug. 11, 2018 (13 Pages).

* cited by examiner

[Fig.1]
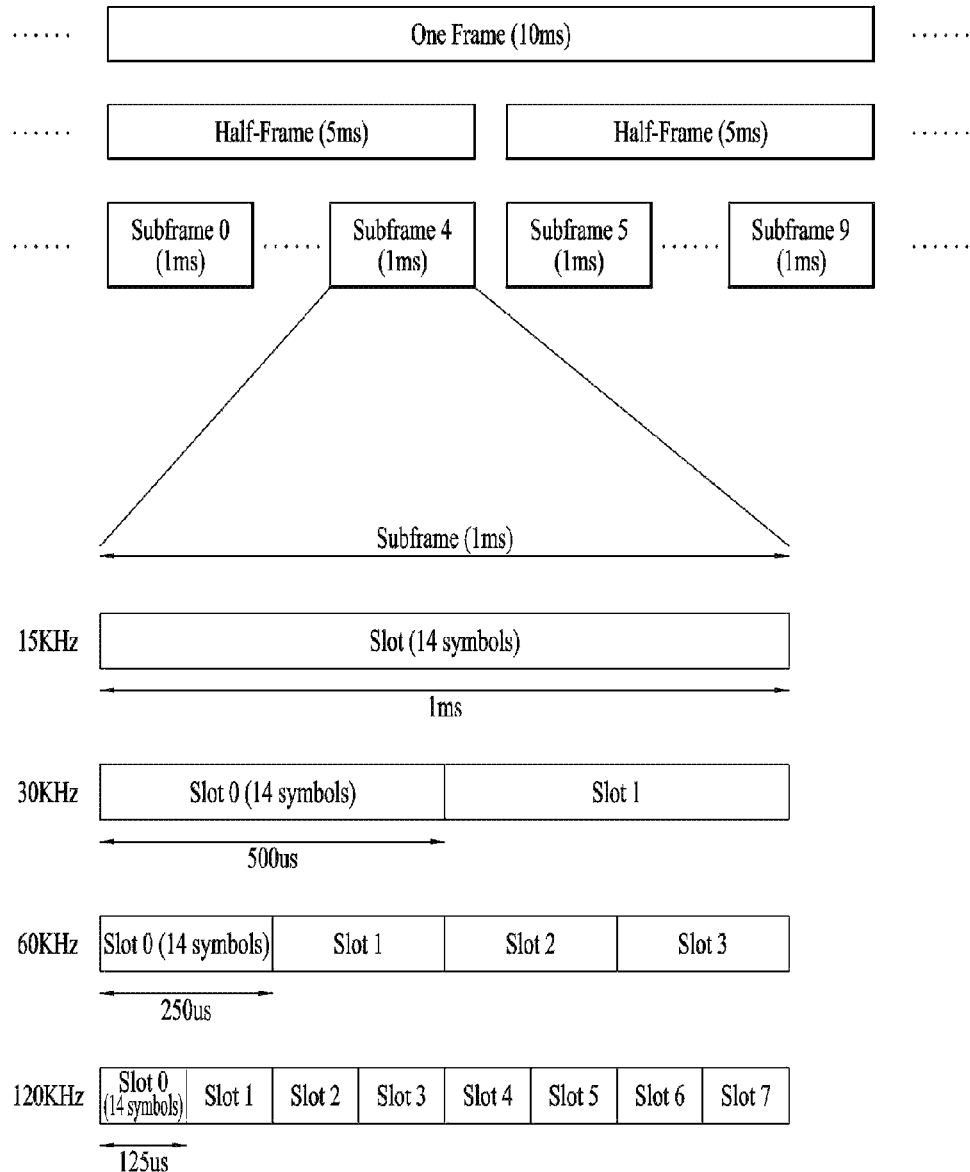

[Fig.2]
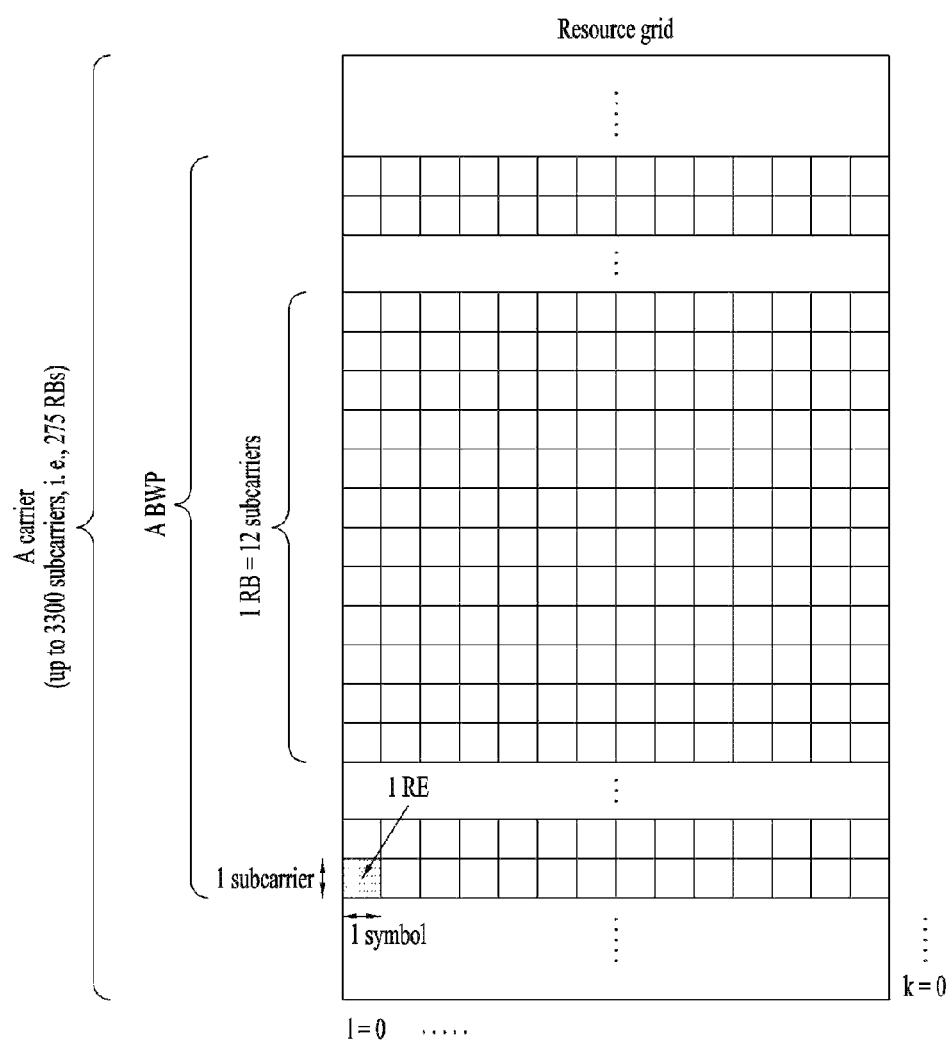

【Fig.3】
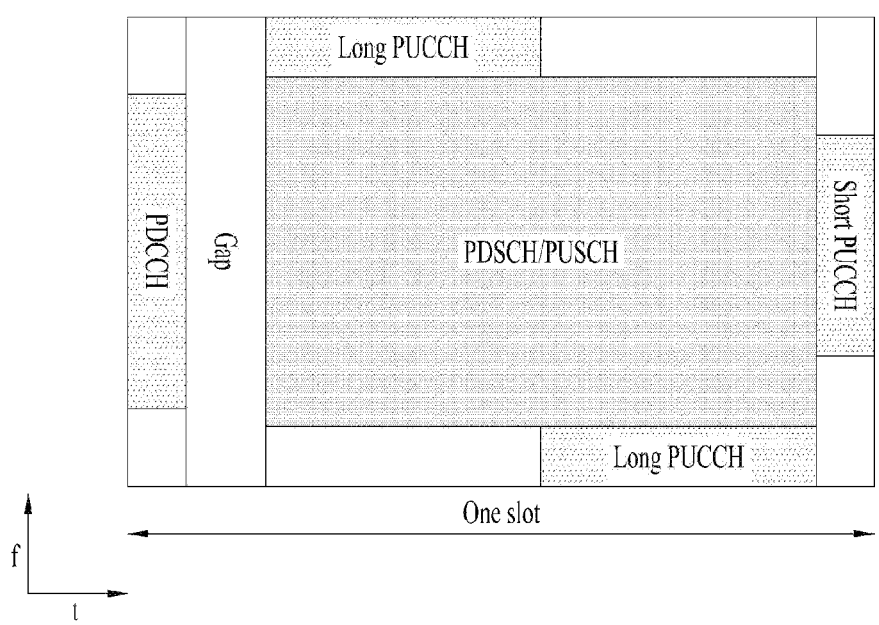

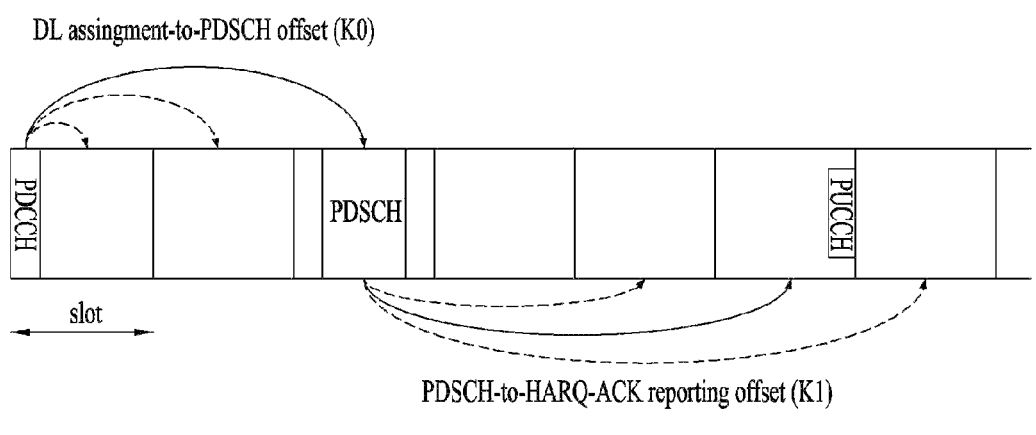
[Fig.4]

[Fig.5]
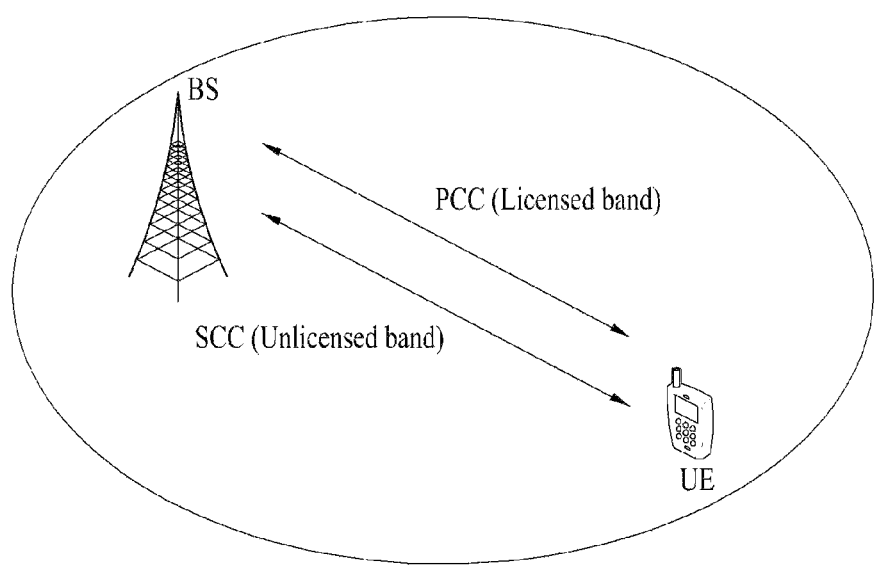
(a) Carrier aggregation between L-band and U-band
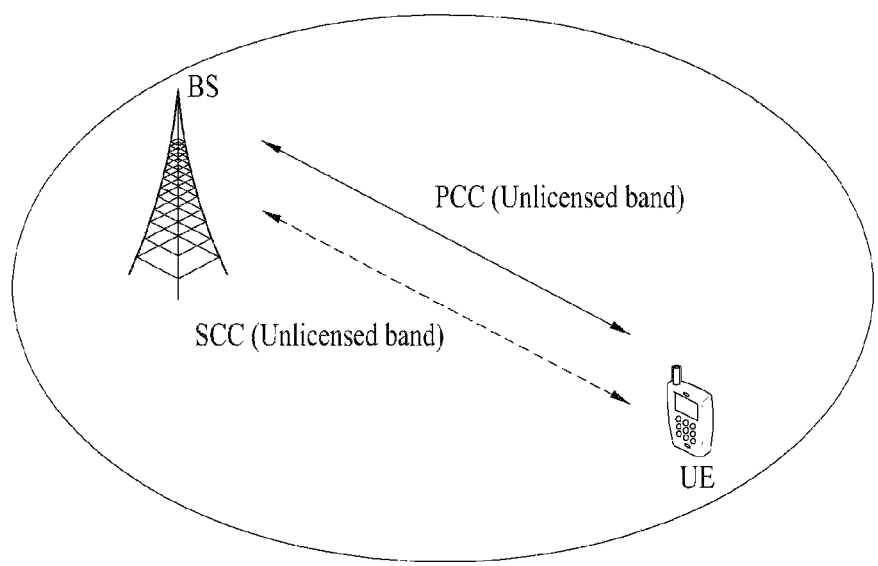
(b) Standalone U-band(s)

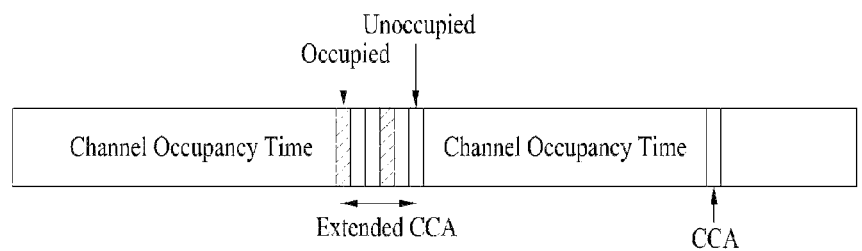
[Fig.6]
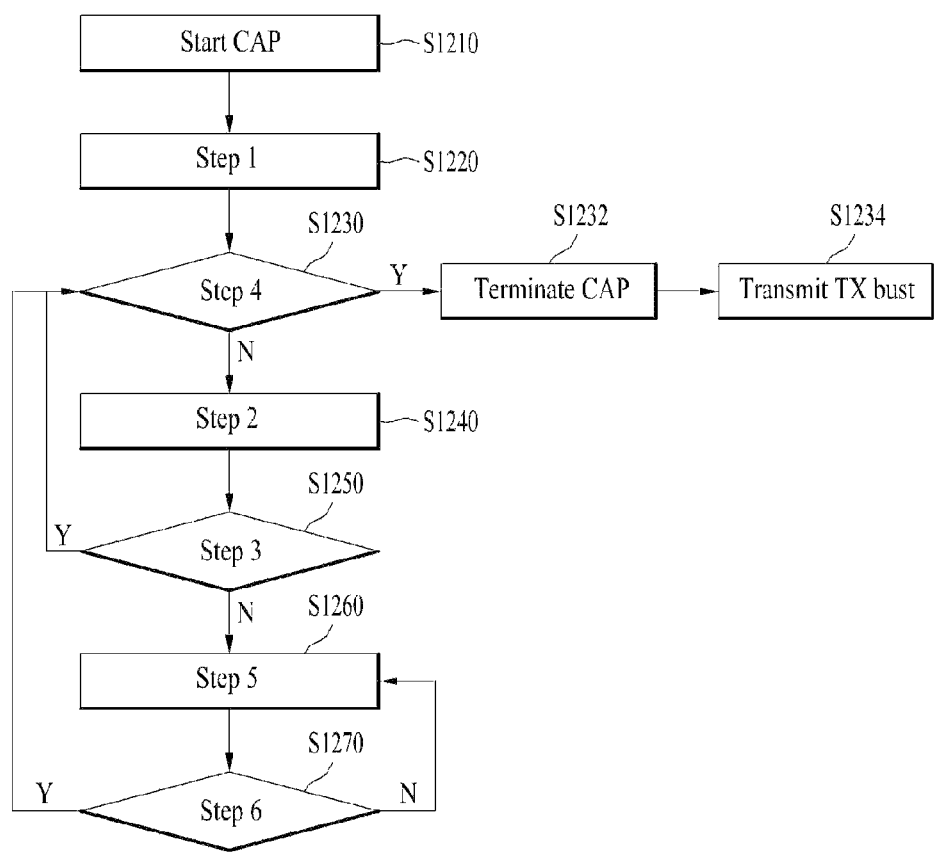
[Fig.7]

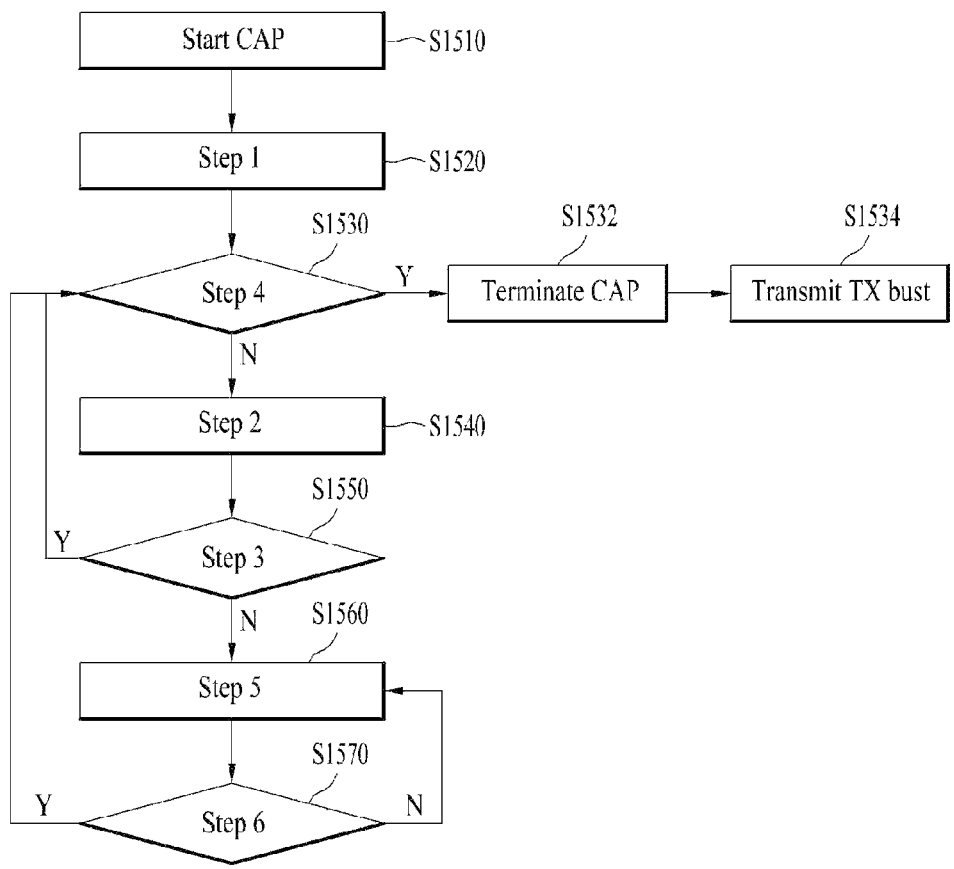
[Fig.8]

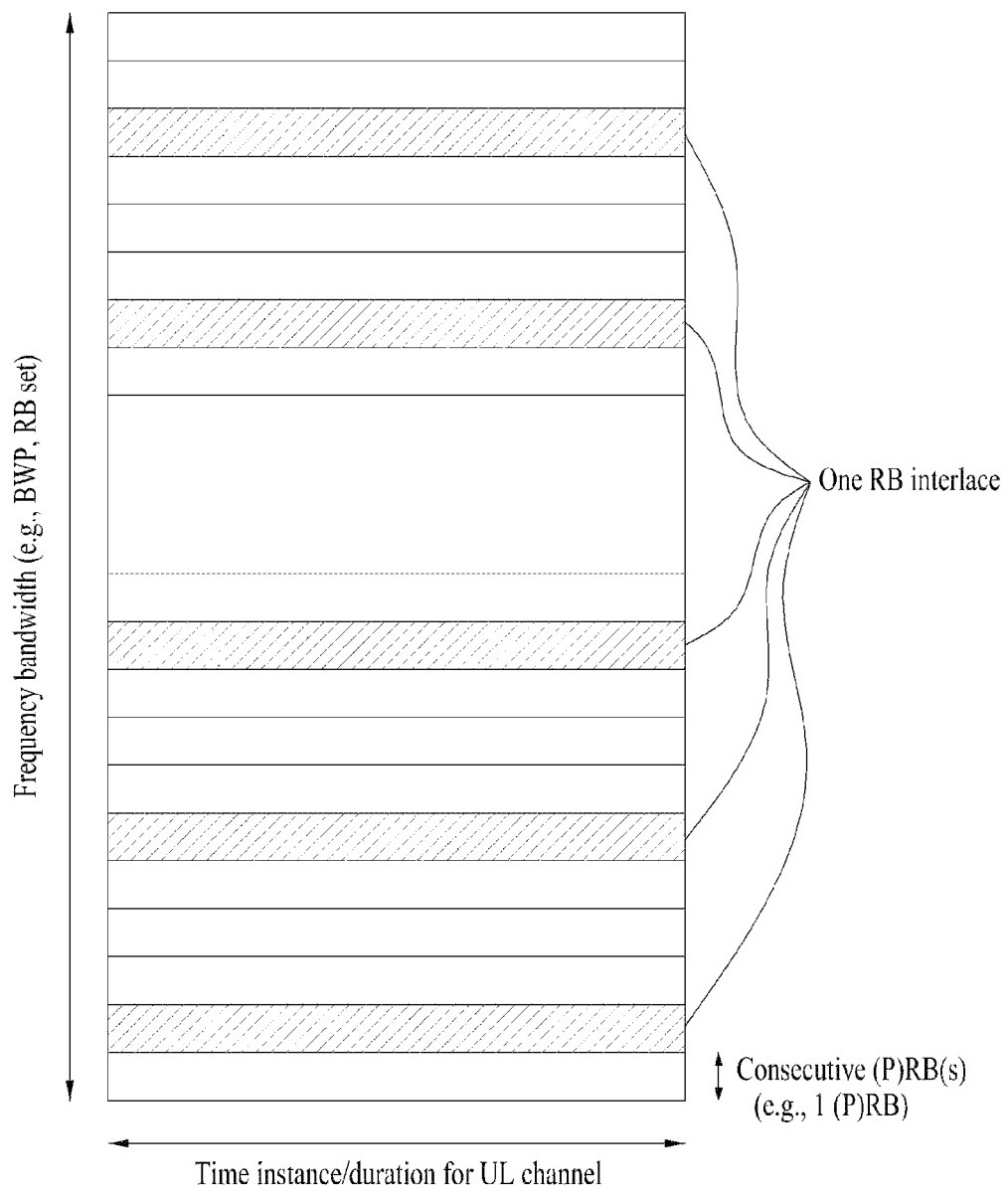
[Fig.9]

【Fig.11】
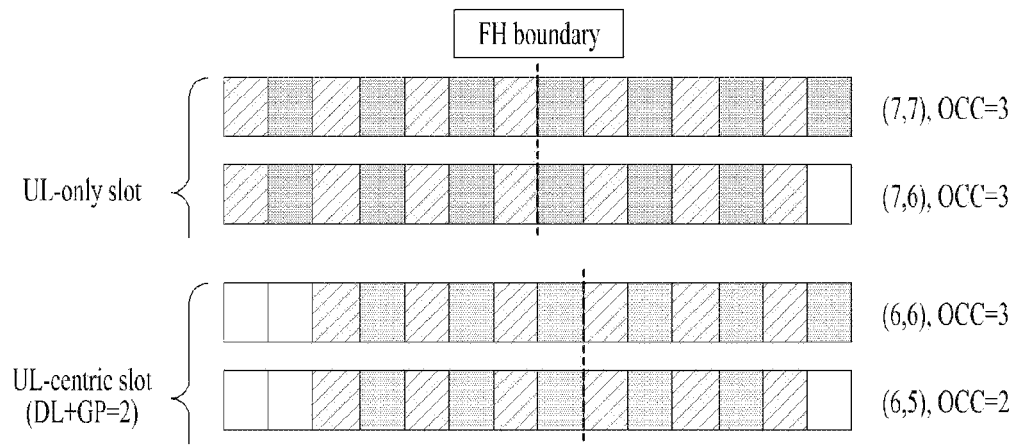
【Fig.12】
| Long PUCCH duration | OCC multiplexing capacity M | |
|---|---|---|
| | With hopping | without hopping |
| 4 | 1 | 2 |
| 5 | 1 | 2 |
| 6 | 1 | 3 |
| 7 | [1] | 3 |
| 8 | 2 | 4 |
| 9 | 2 | 4 |
| 10 | 2 | 5 |
| 11 | [2] | 5 |
| 12 | 3 | 6 |
| 13 | 3 | 6 |
| 14 | 3 | 7 |

[Fig.13]

Definition of φ(n) for $M_{ZC}=12$

| μ | φ(0),...,φ(11) | | | | | | | | | | | |
|---|---|---|---|---|---|---|---|---|---|---|---|---|
| 0  | -3 | 1  | -3 | -3 | -3 | 3  | -3 | -1 | 1  | 1  | 1  | -3 |
| 1  | -3 | 3  | 1  | -3 | 1  | 3  | -1 | -1 | 1  | 3  | 3  | 3  |
| 2  | -3 | 3  | 3  | 1  | -3 | 3  | -1 | 1  | 3  | -3 | 3  | -3 |
| 3  | -3 | -3 | -1 | 3  | 3  | 3  | -3 | 3  | -3 | 1  | -1 | -3 |
| 4  | -3 | -1 | -1 | 1  | 3  | 1  | 1  | -1 | 1  | -1 | -3 | 1  |
| 5  | -3 | -3 | 3  | 1  | -3 | -3 | -3 | -1 | 3  | -1 | 1  | 3  |
| 6  | 1  | -1 | 3  | -1 | -1 | -1 | -3 | -1 | 1  | 1  | 1  | -3 |
| 7  | -1 | -3 | 3  | -1 | -3 | -3 | -3 | -1 | 1  | -1 | 1  | -3 |
| 8  | -3 | -1 | 3  | 1  | -3 | -1 | -3 | 3  | 1  | 3  | 3  | 1  |
| 9  | -3 | -1 | -1 | -3 | -3 | -1 | -3 | 3  | 1  | 3  | -1 | -3 |
| 10 | -3 | 3  | -3 | 3  | 3  | -3 | -1 | -1 | 3  | 3  | 1  | -3 |
| 11 | -3 | -1 | -3 | -1 | -1 | -3 | 3  | 3  | -1 | -1 | 1  | -3 |
| 12 | -3 | -1 | 3  | -3 | -3 | -1 | -3 | 1  | -1 | -3 | 3  | 3  |
| 13 | -3 | 1  | -1 | -1 | 3  | 3  | -3 | -1 | -1 | -3 | -1 | -3 |
| 14 | 1  | 3  | -3 | 1  | 3  | 3  | 3  | 1  | -1 | 1  | -1 | 3  |
| 15 | -3 | 1  | 3  | -1 | -1 | -3 | -3 | -1 | -1 | 3  | 1  | -3 |
| 16 | -1 | -1 | -1 | -1 | 1  | -3 | -1 | 3  | 3  | -1 | -3 | 1  |
| 17 | -1 | 1  | 1  | -1 | 1  | 3  | 3  | -1 | -1 | -3 | 1  | -3 |
| 18 | -3 | 1  | 3  | 3  | -1 | -1 | -3 | 3  | 3  | -3 | 3  | -3 |
| 19 | -3 | -3 | 3  | -3 | -1 | 3  | 3  | 3  | -1 | -3 | 1  | -3 |
| 20 | 3  | 1  | 3  | 1  | 3  | -3 | -1 | 1  | 3  | 1  | -1 | -3 |
| 21 | -3 | 3  | 1  | 3  | -3 | 1  | 1  | 1  | 1  | 3  | -3 | 3  |
| 22 | -3 | 3  | 3  | 3  | -1 | -3 | -3 | -1 | -3 | 1  | 3  | -3 |
| 23 | 3  | -1 | -3 | 3  | -3 | -1 | 3  | 3  | 3  | -3 | -1 | -3 |
| 24 | -3 | -1 | 1  | -3 | 1  | 3  | 3  | 3  | -1 | -3 | 3  | 3  |
| 25 | -3 | 3  | 1  | -1 | 3  | 3  | -3 | 1  | -1 | 1  | -1 | 1  |
| 26 | -1 | 1  | 3  | -3 | 1  | -1 | 1  | -1 | -1 | -3 | 1  | -1 |
| 27 | -3 | -3 | 3  | 3  | 3  | -3 | -1 | 1  | -3 | 3  | 1  | -3 |
| 28 | 1  | -1 | 3  | 1  | 1  | -1 | -1 | -1 | 1  | 3  | -3 | 1  |
| 29 | -3 | 3  | -3 | 3  | -3 | -3 | 3  | -1 | -1 | 1  | 3  | -3 |

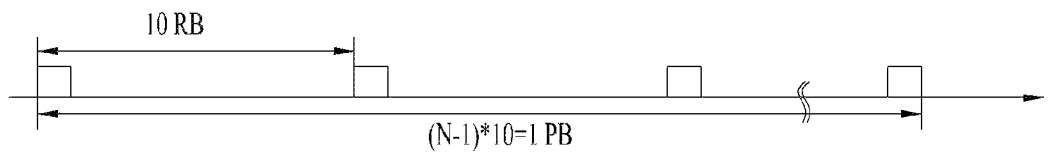
【Fig.14】
| An example of PAPR/CM of sequence repetition in frequency domain (N=3) | | | | | |
|---|---|---|---|---|---|
| Index | PS #1 | PS #2 | PS #3 | PAPR | CM |
| 3 | 1 | 1 | 1 | 4.047482 | 1.862 |
| 11 | 1 | -1 | -1 | 4.045772 | 1.862 |
| 5 | 1 | 0+1i | 1 | 4.040636 | 1.864 |
| 13 | 1 | 0-1i | 1 | 4.035495 | 1.864 |
| 2 | 1 | 1 | 0+1i | 5.519986 | 3.558 |
| 6 | 1 | 0+1i | 0+1i | 5.51511 | 3.558 |
| 8 | 1 | 0+1i | 0-1i | 5.511449 | 3.558 |
| 12 | 1 | -1 | 0-1i | 5.516329 | 3.558 |
| 10 | 1 | -1 | 0+1i | 5.51267 | 3.56 |
| 14 | 1 | 0-1i | 0+1i | 5.511449 | 3.56 |
【Fig.15】

FIG. 16

| An example of PAPR/CM of sequence repetition in frequency domain (N=4) | | | | | | |
|---|---|---|---|---|---|---|
| Index | PS #1 | PS #2 | PS #3 | PS #4 | PAPR | CM |
| 50 | 1 | 0-1i | 1 | 0+1i | 4.143883 | 1.958 |
| 43 | 1 | -1 | -1 | -1 | 4.152238 | 1.96 |
| 9 | 1 | 1 | -1 | 1 | 4.147227 | 1.961 |
| 20 | 1 | 0+1i | 1 | 0-1i | 4.158911 | 1.963 |
| 48 | 1 | -1 | 0-1i | 0-1i | 4.035495 | 1.969 |
| 8 | 1 | 1 | 0+1i | 0-1i | 4.040636 | 1.97 |
| 14 | 1 | 1 | 0-1i | 0+1i | 4.01659 | 1.971 |
| 38 | 1 | -1 | 0+1i | 0+1i | 4.021754 | 1.971 |
| 21 | 1 | 0+1i | 0-1i | 1 | 4.023474 | 1.972 |
| 6 | 1 | 0-1i | 0-1i | 1 | 4.025193 | 1.972 |

FIG. 17

An example of PAPR/CM of sequence repetition in frequency domain (N=5)

| Index | PS #1 | PS #2 | PS #3 | PS #4 | PS #5 | PAPR | CM |
|---|---|---|---|---|---|---|---|
| 101 | 1 | -1+1i | -1 | -1+1i | 1 | 4.007969 | 1.652 |
| 237 | 1 | -1+1i | -1 | -1+1i | 1 | 4.013144 | 1.652 |
| 129 | 1 | -1 | 1 | 1 | 1 | 4.02474 | 1.655 |
| 9 | 1 | -1 | 1 | -1 | 1 | 4.014867 | 1.656 |
| 192 | 1 | 1 | -1+1i | -1+1i | -1+1i | 4.22015 | 2.227 |
| 30 | 1 | -1+1i | -1+1i | -1+1i | -1+1i | 4.231639 | 2.228 |
| 122 | 1 | -1+1i | -1+1i | -1 | -1+1i | 4.226719 | 2.229 |
| 220 | 1 | -1+1i | -1+1i | -1 | -1+1i | 4.22836 | 2.229 |
| 84 | 1 | -1+1i | -1+1i | 1 | -1+1i | 4.23 | 2.231 |
| 242 | 1 | -1+1i | -1+1i | 1 | -1+1i | 4.233278 | 2.231 |

FIG. 18

An example of PAPR/CM of sequence repetition in frequency domain (N=6)

| Index | PS #1 | PS #2 | PS #3 | PS #4 | PS #5 | PS #6 | PAPR | CM |
|---|---|---|---|---|---|---|---|---|
| 72 | 1 | 1 | 0+1i | 1 | 0+1i | 0-1i | 4.381466 | 2.414 |
| 752 | 1 | -1 | 0-1i | -1 | 0-1i | 0-1i | 4.379883 | 2.414 |
| 389 | 1 | 0-1i | 0+1i | 0+1i | 0+1i | -1 | 4.373541 | 2.415 |
| 983 | 1 | 0+1i | 0-1i | 0+1i | 0+1i | -1 | 4.375127 | 2.415 |
| 501 | 1 | 0+1i | 0+1i | 0+1i | 0+1i | 1 | 4.378298 | 2.416 |
| 861 | 1 | 0-1i | 0+1i | 0+1i | 0-1i | 1 | 4.379883 | 2.416 |
| 206 | 1 | 1 | 0-1i | 1 | 0-1i | 0+1i | 4.373541 | 2.419 |
| 614 | 1 | -1 | 0+1i | -1 | 0+1i | 0+1i | 4.373541 | 2.419 |
| 692 | 1 | -1 | -1 | 0-1i | 0-1i | 0-1i | 4.436541 | 2.435 |
| 180 | 1 | 1 | 1 | 0-1i | 0-1i | 0-1i | 4.445912 | 2.436 |

FIG. 19

An example of PAPR/CM of sequence repetition in frequency domain (N=7)

| Index | PS #1 | PS #2 | PS #3 | PS #4 | PS #5 | PS #6 | PS #7 | PAPR | CM |
|---|---|---|---|---|---|---|---|---|---|
| 163 | 1 | 1 | 1 | -1 | -1 | 1 | -1 | 3.280737 | 1.296 |
| 1637 | 1 | 0+1i | -1 | 0+1i | -1 | 0+1i | 1 | 3.282776 | 1.297 |
| 2081 | -1 | 1 | 1 | 1 | -1 | -1 | -1 | 3.280737 | 1.297 |
| 3821 | 1 | 0-1i | -1 | 0-1i | -1 | 0-1i | 1 | 3.284815 | 1.297 |
| 1775 | 1 | 0-1i | -1 | 0-1i | -1 | 0-1i | 1 | 4.035495 | 2.044 |
| 2209 | 1 | -1 | 1 | -1 | -1 | 1 | 1 | 4.040636 | 2.046 |
| 41 | 1 | 1 | 1 | 1 | -1 | -1 | 1 | 4.030347 | 2.048 |
| 3687 | 1 | 0-1i | -1 | 0-1i | -1 | 0-1i | -1 | 4.037209 | 2.049 |
| 3271 | 1 | 0-1i | 1 | 0-1i | 1 | 0-1i | -1 | 4.05261 | 2.056 |
| 649 | 1 | 1 | -1 | -1 | 1 | -1 | 1 | 4.05261 | 2.058 |

FIG. 20

An example of PAPR/CM of sequence repetition in frequency domain (N=8)

| Index | PS #1 | PS #2 | PS #3 | PS #4 | PS #5 | PS #6 | PS #7 | PS #8 | PAPR | CM |
|---|---|---|---|---|---|---|---|---|---|---|
| 3859 | 1 | 1 | 0+1i | 0+1i | 1 | 0+1i | 1 | -1 | 3.833865 | 1.741 |
| 10801 | 1 | -1 | 0+1i | 0+1i | 1 | 0+1i | 1 | 1 | 3.840845 | 1.742 |
| 13324 | 1 | 0+1i | 0+1i | 1 | 1 | 1 | -1 | 0+1i | 3.83807 | 1.742 |
| 5674 | 1 | 0+1i | 0+1i | -1 | 0+1i | -1 | 1 | 0+1i | 3.849803 | 1.743 |
| 8164 | 1 | 0+1i | 0+1i | 0+1i | -1 | -1 | -1 | 0+1i | 3.837256 | 1.743 |
| 9079 | 1 | -1 | 0+1i | -1 | 0+1i | 0+1i | -1 | -1 | 3.846222 | 1.743 |
| 15916 | 1 | 0+1i | 0+1i | 0+1i | 1 | 0+1i | 1 | 0+1i | 3.840845 | 1.744 |
| 1331 | 1 | 1 | 0+1i | 0+1i | 0+1i | 0+1i | 1 | -1 | 3.840845 | 1.744 |
| 3193 | 1 | 0+1i | 0+1i | 1 | 1 | 1 | -1 | 1 | 3.855169 | 1.744 |
| 7178 | 1 | 0+1i | 0+1i | 0+1i | 1 | 1 | -1 | 0+1i | 3.837256 | 1.744 |

FIG. 21

An example of PAPR/CM of sequence repetition in frequency domain (N=9)

| Index | PS #1 | PS #2 | PS #3 | PS #4 | PS #5 | PS #6 | PS #7 | PS #8 | PS #9 | PAPR | CM |
|---|---|---|---|---|---|---|---|---|---|---|---|
| 28319 | 1 | 0+1i | -1 | 0+1i | -1 | -1 | 0+1i | 0+1i | -1 | 3.563127 | 1.537 |
| 723 | 1 | 0+1i | -1 | 1 | 1 | 0+1i | 0+1i | 0+1i | -1 | 3.566695 | 1.538 |
| 2823 | 1 | 1 | -1 | 0+1i | 1 | 0+1i | 0+1i | 0+1i | -1 | 3.555473 | 1.539 |
| 3549 | 1 | -1 | -1 | -1 | -1 | 0+1i | 0+1i | -1 | -1 | 3.572677 | 1.539 |
| 5890 | 1 | 0+1i | -1 | 0+1i | 1 | 0+1i | 0+1i | 0+1i | -1 | 3.599302 | 1.539 |
| 35579 | 1 | -1 | -1 | -1 | 1 | 0+1i | 0+1i | 0+1i | -1 | 3.565039 | 1.54 |
| 59063 | 1 | 0+1i | -1 | 0+1i | 1 | 0+1i | 0+1i | 0+1i | -1 | 3.561215 | 1.542 |
| 627 | 1 | 1 | -1 | 1 | -1 | 0+1i | -1 | 1 | -1 | 3.561215 | 1.543 |
| 40167 | 1 | -1 | 0+1i | 0+1i | -1 | -1 | -1 | -1 | -1 | 3.580368 | 1.547 |
| 53447 | 1 | 0+1i | 0+1i | 0+1i | 1 | 0+1i | -1 | 0+1i | -1 | 3.580301 | 1.547 |

An example of PAPR&CM of sequence repetition in frequency domain (N=11)

| Index | PS #1 | PS #2 | PS #3 | PS #4 | PS #5 | PS #6 | PS #7 | PS #8 | PS #9 | PS #10 | PS #11 | PAPR | CM |
|---|---|---|---|---|---|---|---|---|---|---|---|---|---|
| 43171 | 1 | 0+1i | -1 | 0+1i | -1 | 0+1i | -1 | 0+1i | -1 | 0+1i | -1 | 2.894775 | 1.092 |
| 421477 | 1 | 0+1i | -1 | 0-1i | -1 | 0+1i | -1 | 0+1i | -1 | 0+1i | -1 | 2.894775 | 1.092 |
| 55253 | 1 | -1 | -1 | 0-1i | -1 | 0+1i | -1 | 0-1i | -1 | 0+1i | -1 | 2.894775 | 1.092 |
| 97662 | 1 | -1 | -1 | 0-1i | -1 | 0+1i | -1 | 0-1i | -1 | 0-1i | -1 | 2.894775 | 1.092 |
| 24803 | 1 | -1 | -1 | 0-1i | -1 | 0+1i | -1 | 0-1i | -1 | -1 | -1 | 3.536278 | 1.496 |
| 57443 | 1 | -1 | -1 | -1 | -1 | 0+1i | -1 | 0+1i | -1 | 0+1i | -1 | 3.534353 | 1.496 |
| 404109 | 1 | 0+1i | -1 | -1 | -1 | 0+1i | -1 | 0+1i | -1 | 0+1i | -1 | 3.536278 | 1.496 |
| 43749 | 1 | 0+1i | -1 | 0+1i | -1 | -1 | -1 | 0-1i | -1 | -1 | -1 | 3.34353 | 1.496 |
| 55147 | 1 | -1 | -1 | -1 | -1 | -1 | -1 | 0-1i | -1 | 0+1i | -1 | 3.536278 | 1.496 |
| 583787 | 1 | -1 | -1 | 0-1i | -1 | -1 | -1 | 0+1i | -1 | -1 | -1 | 3.536278 | 1.496 |

[Fig.38]
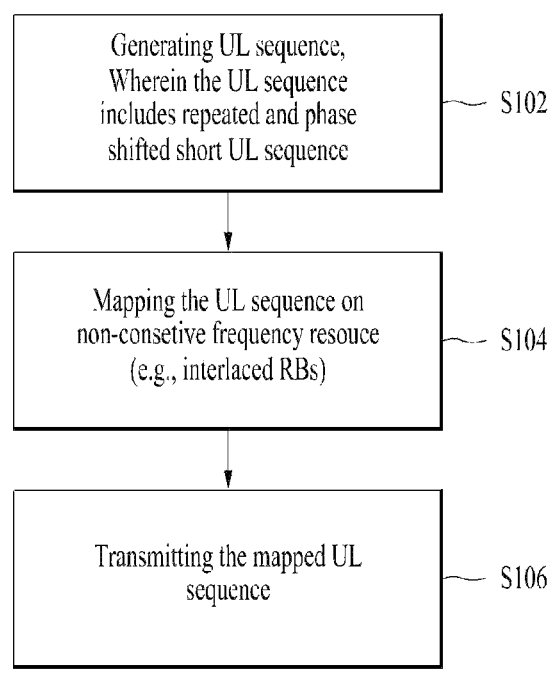

[Fig.39]
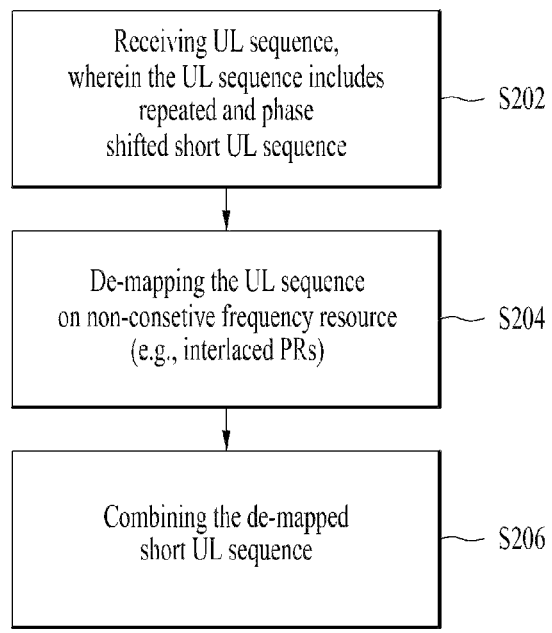

[Fig.40]
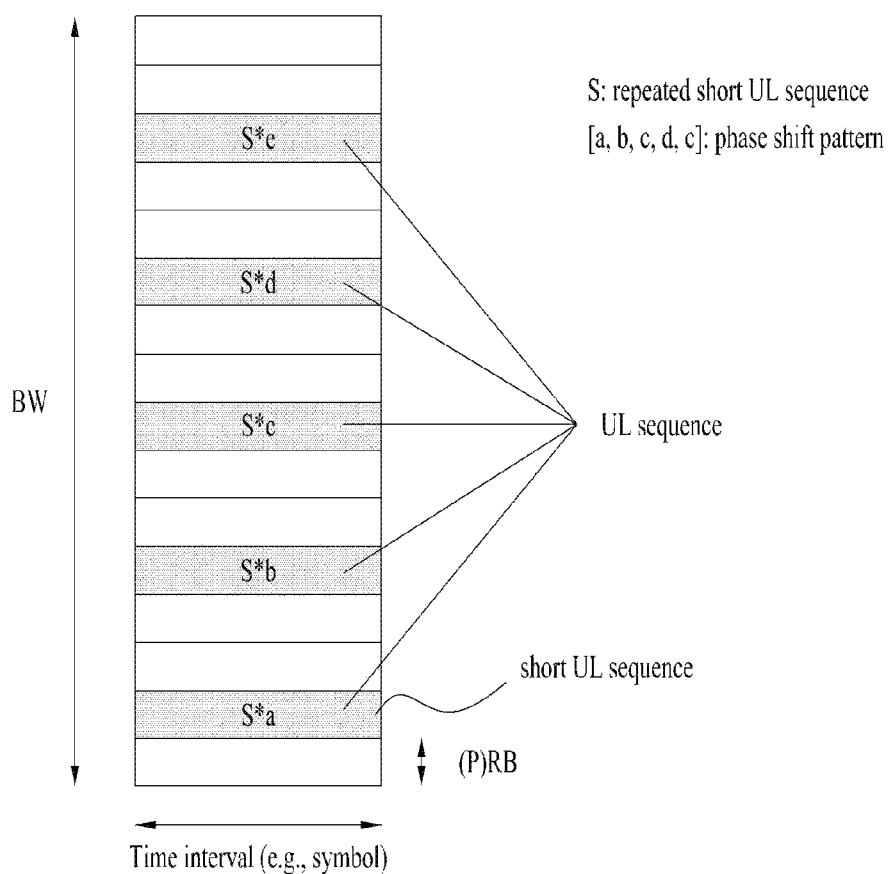

[Fig.41]
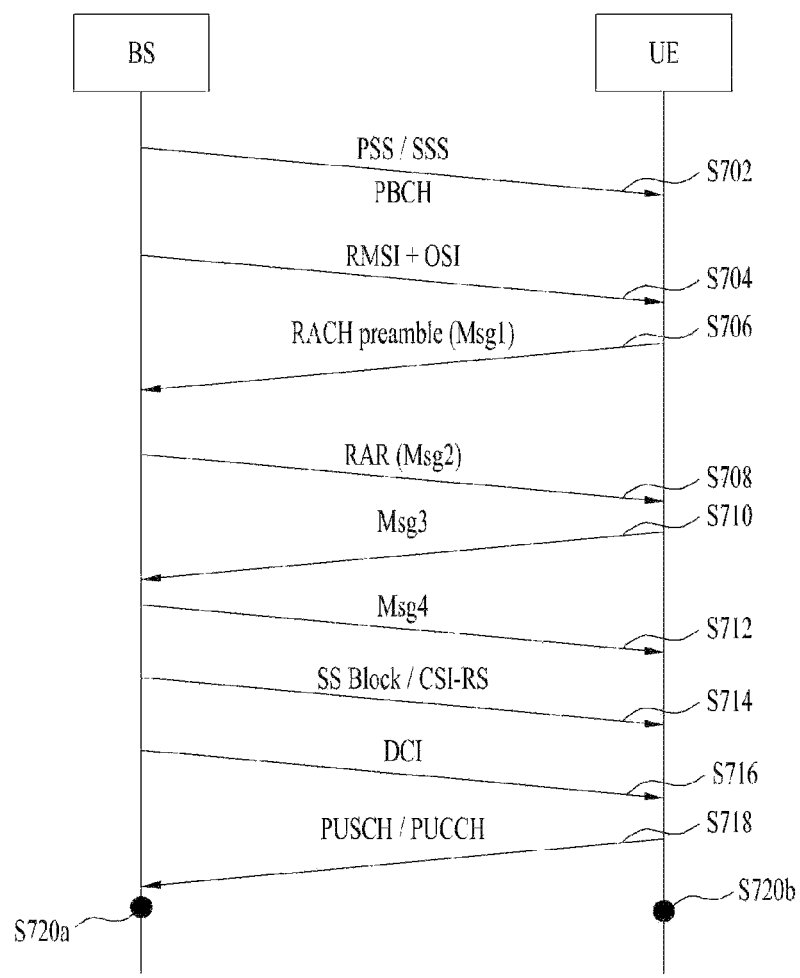

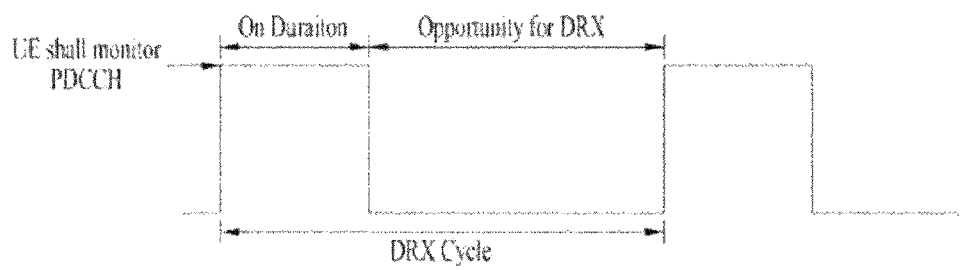
[Fig.42]

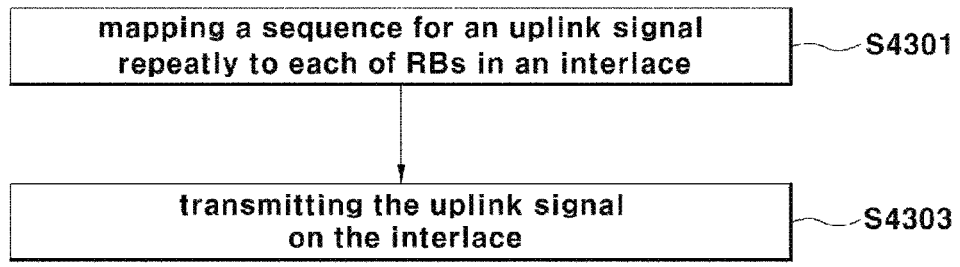
[Fig.43]
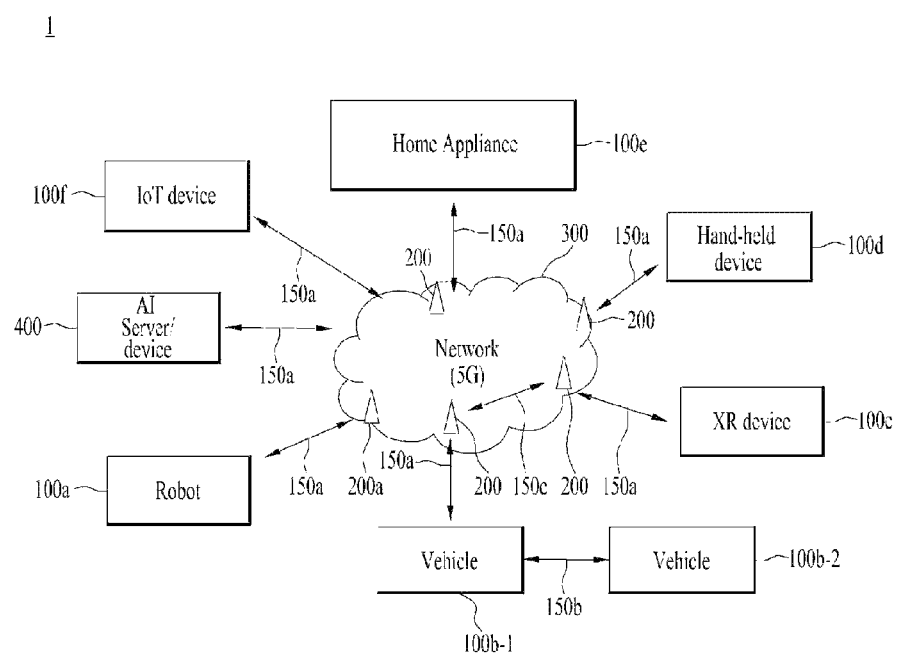
[Fig.44]

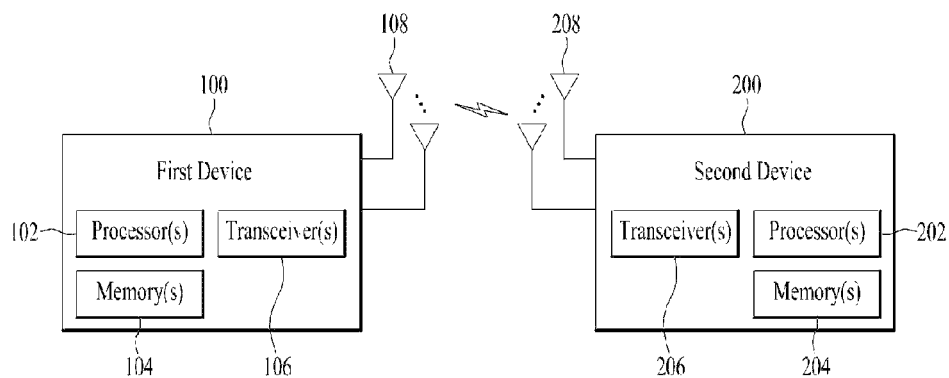
【Fig.45】
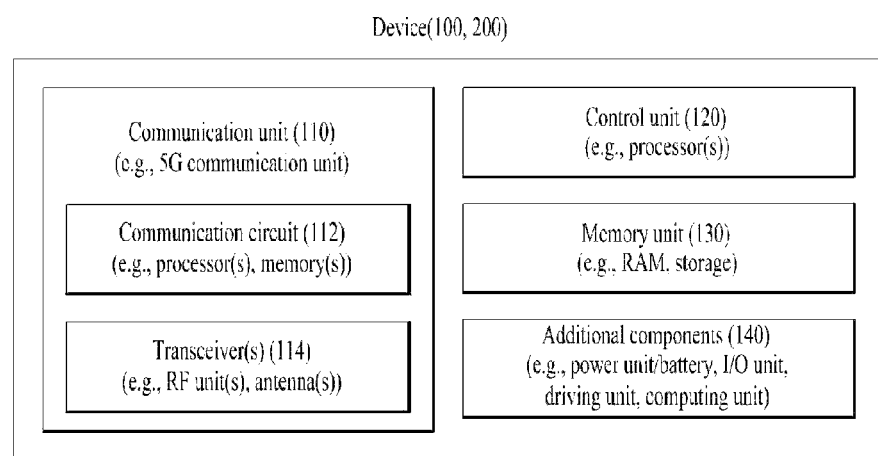
【Fig.46】

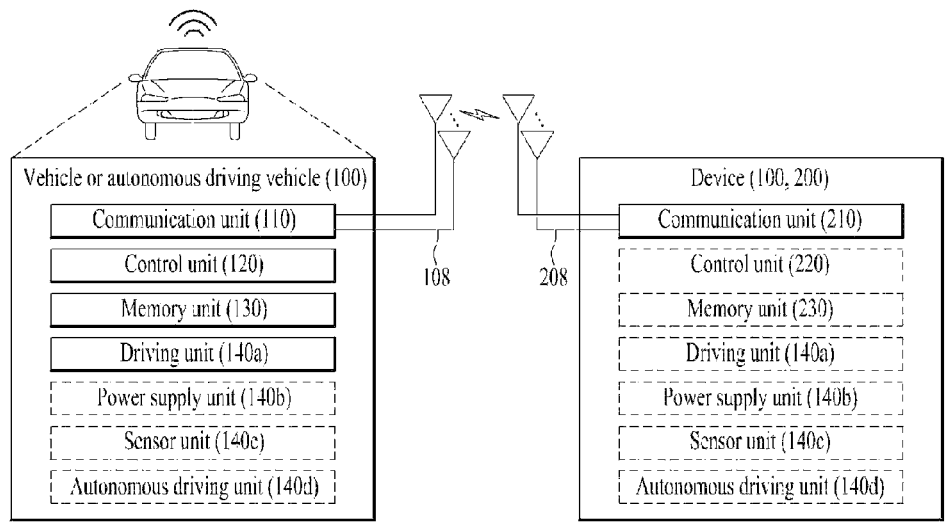
[Fig.47]
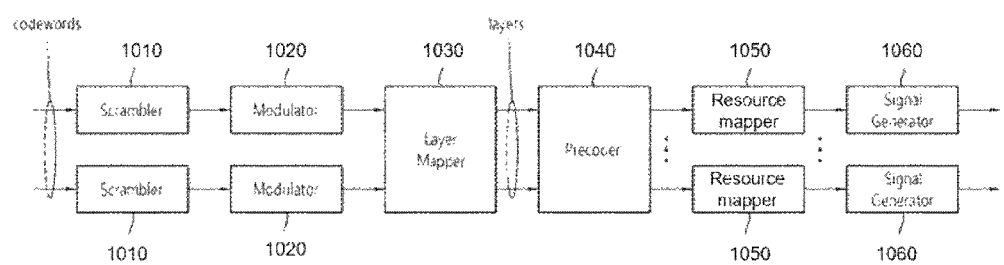
[Fig.48]

METHOD AND DEVICE FOR TRANSMITTING AND RECEIVING SIGNALS IN WIRELESS COMMUNICATION SYSTEM

This application is the National Stage filing under 35 U.S.C. 371 of International Application No. PCT/KR2020/095114 filed on Aug. 14, 2020, which claims priority to Korean Patent Application Nos. 10-2019-0100013 filed on Aug. 15, 2019; 10-2019-0100016 filed on Aug. 15, 2019 and 10-2019-0100017 filed on Aug. 15, 2019, the contents of which are all hereby incorporated by reference herein in their entirety.

TECHNICAL FIELD

The present disclosure relates to a method and apparatus for use in a wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

DISCLOSURE

Technical Problems

The object of the present disclosure is to provide a method and apparatus for transmitting an uplink channel efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present disclosure provides a method and apparatus for transmitting and receiving a signal in a wireless communication system.

According to an aspect of the present disclosure, provided herein is a method of transmitting and receiving a signal by a user equipment (UE) in a wireless communication system, including repeatedly mapping a sequence for an uplink signal to resource blocks (RBs) in an interlace; and transmitting the uplink signal on the interlace. The number of the RBs constituting the interlace is a prime number.

In another aspect of the present disclosure, provided herein is a communication apparatus (user equipment (UE)) for transmitting and receiving a signal in a wireless communication system, including at least one transceiver; at least one processor; and at least one memory operably connected to the at least one processor and configured to store instructions for causing, when executed, the at least one processor to perform a specific operation. The specific operation includes repeatedly mapping a sequence for an uplink signal to resource blocks (RBs) in an interlace, and transmitting the uplink signal on the interlace. The number of the RBs constituting the interlace is a prime number.

In another aspect of the present disclosure, provided herein is an apparatus for a user equipment (UE), including at least one processor; and at least one computer memory operably connected to the at least one processor and configured to cause, when executed, the at least one processor to perform an operation. The operation includes repeatedly mapping a sequence for an uplink signal to resource blocks (RBs) in an interlace, and transmitting the uplink signal on the interlace. The number of the RBs constituting the interlace is a prime number.

In another aspect of the present disclosure, provided herein is a computer readable storage medium configured to store at least one computer program for causing at least one processor to perform an operation. The operation includes repeatedly mapping a sequence for an uplink signal to resource blocks (RBs) in an interlace, and transmitting the uplink signal on the interlace. The number of the RBs constituting the interlace is a prime number.

In the above method and apparatuses, the sequence for the uplink signal may be repeatedly mapped based on a phase shift pattern. The phase shift pattern may be a pattern of phase shift (PS) values for the RBs.

In the above method and apparatuses, the phase shift pattern may be determined, in a state in which a PS value for a sequence to be mapped to an RB having a lowest RB index among the RBs is 1, by selecting each PS value to be applied to the remaining RBs among the RBs based on a peak-to-average power ratio (PAPR) and a cubic metric (CM).

In the above method and apparatuses, the phase shift pattern may be one of a plurality of usable phase shift patterns. Among the plural phase shift patterns, a pattern for the number of repetitions of the same PS value in a first phase shift pattern may have a symmetric relationship with a pattern for the number of repetitions of the same PS value in a second pattern.

In the above method and apparatuses, the uplink signal may include a physical random access channel (PRACH), a physical uplink control channel (PUCCH), a physical uplink shared channel (PUSCH), a demodulation reference signal (DM-RS), a phase tracking reference signal (PT-RS), and/or a sounding reference signal (SRS).

The communication apparatus may include an autonomous driving vehicle communicable with at least a UE, a network, and another autonomous driving vehicle other than the communication apparatus.

The above-described aspects of the present disclosure are only some of the preferred embodiments of the present disclosure, and various embodiments reflecting the technical features of the present disclosure may be derived and understood from the following detailed description of the present disclosure by those skilled in the art.

Advantageous Effects

According to an embodiment of the present disclosure, a communication apparatus may transmit an uplink channel more efficiently in a different way from the prior art.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 1 illustrates a radio frame structure.

FIG. 2 illustrates a resource grid during the duration of a slot.

FIG. 3 illustrates a self-contained slot structure.

FIG. 4 illustrates an acknowledgment/negative acknowledgment (ACK/NACK) transmission process.

FIG. 5 illustrates a wireless communication system supporting an unlicensed band.

FIG. 6 illustrates an exemplary method of occupying resources in an unlicensed band.

FIGS. 7 and 8 are flowcharts illustrating channel access procedures (CAPs) for signal transmission in an unlicensed band.

FIG. 9 illustrates a resource block (RB) interlace.

FIGS. 10 to 43 are a diagram illustrating uplink (UL) channel transmission according to the embodiments of the present disclosure.

FIGS. 44 to 48 illustrate devices according to an embodiment of the present disclosure.

BEST MODE

Figure 10:
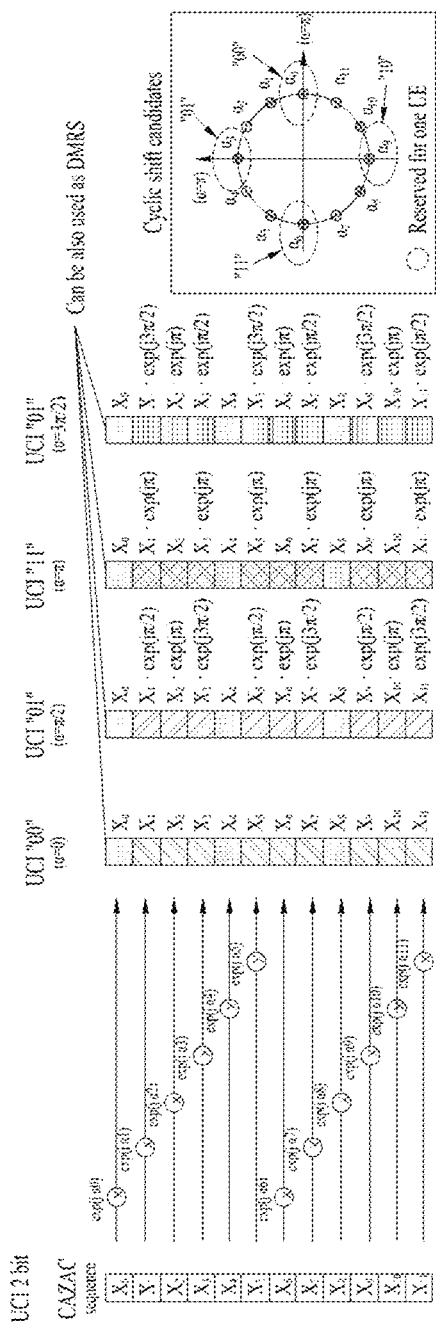

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP NR
- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS(15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame, u}_{slot}$: number of slots in a frame
* $N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS(15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
| --- | --- | --- |
| FR1 | 450 MHz-7125 MHz | 15, 30, 60 kHz |
| FR2 | 24250 MHz-52600 MHz | 60, 120, 240 kHz |

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A plurality of RB interlaces (simply, interlaces) may be defined in the frequency domain. An interlace m∈ {0, 1, ..., M−1} may consist of (common) RBs {m, M+m, 2M+m, 3M+m, ... }, where M represents the number of interlaces. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a UE receives information from a BS in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a base station (BS) may be, for example, a gNode B (gNB).

UL Physical Channels/Signals (1) PUSCH

A PUSCH may carry UL data (e.g., uplink shared channel (UL-SCH) transport block (TB)) and/or uplink control information (UCI). The PUSCH may be transmitted based on a cyclic prefix orthogonal frequency division multiplexing (CP-OFDM) waveform or a discrete Fourier transform spread OFDM (DFT-s-OFDM) waveform. When the PUSCH is transmitted based on the DFT-s-OFDM waveform, the UE may transmit the PUSCH by applying transform precoding. For example, when the transform precoding is not allowed (e.g., when the transform precoding is disabled), the UE may transmit the PUSCH based on the CP-OFDM waveform. When the transform precoding is allowed (e.g., when the transform precoding is enabled), the UE may transmit the PUSCH based on the CP-OFDM waveform or DFT-s-OFDM waveform. PUSCH transmission may be dynamically scheduled by a PDCCH (dynamic scheduling) or semi-statically scheduled by higher layer signaling (e.g., RRC signaling) (and/or Layer 1 (L1) signaling (e.g., PDCCH)) (configured scheduling (CS)). Therefore, in the dynamic scheduling, the PUSCH transmission may be associated with the PDCCH, whereas in the CS, the PUSCH transmission may not be associated with the PDCCH. The CS may include PUSCH transmission based on a Type-1 configured grant (CG) and PUSCH transmission based on a Type-2 CG. For the Type-1 CG, all parameters for PUSCH transmission may be signaled by the higher layer. For the Type-2 CG, some parameters for PUSCH transmission may be signaled by higher layers, and the rest may be signaled by the PDCCH. Basically, in the CS, the PUSCH transmission may not be associated with the PDCCH.

(2) PUCCH

A PUCCH may carry UCI. The UCI includes the following information.

Scheduling request (SR): The SR is information used to request a UL-SCH resource.

Hybrid automatic repeat and request acknowledgement) (HARQ-ACK): The HARQ-ACK is a signal in response to reception of a DL signal (e.g., PDSCH, SPS release PDCCH, etc.). The HARQ-ACK response may include positive ACK (ACK), negative ACK (NACK), DTX (Discontinuous Transmission), or NACK/DTX. The HARQ-ACK may be interchangeably used with A/N, ACK/NACK, HARQ-ACK/NACK, and the like. The HARQ-ACK may be generated on a TB/CBG basis.

Channel Status Information (CSI): The CSI is feedback information on a DL channel. The CSI includes a channel quality indicator (CQI), a rank indicator (RI), a precoding matrix indicator (PMI), a precoding type indicator (PTI), and so on.

Table 4 shows PUCCH formats. The PUCCH formats may be classified according to UCI payload sizes/transmission lengths (e.g., the number of symbols included in a PUCCH resource) and/or transmission structures. The PUCCH formats may be classified into short PUCCH formats (PUCCH formats 0 and 2) and long PUCCH formats (PUCCH formats 1, 3, and 4) according to the transmission lengths.

TABLE 4

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

(0) PUCCH Format 0 (PF0)
 Supportable UCI payload size: up to K bits (e.g., K=2)
 Number of OFDM symbols included in one PUCCH: 1 to X symbols (e.g., X=2)
 Transmission structure: only a UCI signal is configured with no DM-RS, and a UCI state is transmitted by selecting and transmitting one of a plurality of sequences.

(1) PUCCH Format 1 (PF1)
 Supportable UCI payload size: up to K bits (e.g., K=2)
 Number of OFDM symbols included in one PUCCH: Y to Z symbols (e.g., Y=4 and Z=14)
 Transmission structure: UCI and a DM-RS are configured in different OFDM symbols based on time division multiplexing (TDM). For the UCI, a specific sequence is multiplied by a modulation symbol (e.g., QPSK symbol). A cyclic shift/orthogonal cover code (CS/OCC) is applied to both the UCI and DM-RS to support code division multiplexing (CDM) between multiple PUCCH resources (complying with PUCCH format 1) (in the same RB).

(2) PUCCH Format 2 (PF2)
 Supportable UCI payload size: more than K bits (e.g., K=2)
 Number of OFDM symbols included in one PUCCH: 1 to X symbols (e.g., X=2)
 Transmission structure: UCI and a DM-RS are configured/mapped in/to the same symbol based on frequency division multiplexing (FDM), and encoded UCI bits are transmitted by applying only an inverse fast Fourier transform (IFFT) thereto with no DFT.

(3) PUCCH Format 3 (PF3)
 Supportable UCI payload size: more than K bits (e.g., K=2)
 Number of OFDM symbols included in one PUCCH: Y to Z symbols (e.g., Y=4 and Z=14)
 Transmission structure: UCI and a DM-RS are configured/mapped in/to different symbols based on TDM. Encoded UCI bits are transmitted by applying a DFT thereto. To support multiplexing between multiple UEs, an OCC is applied to the UCI, and a CS (or interleaved frequency division multiplexing (IFDM) mapping) is applied to the DM-RS before the DFT.

(4) PUCCH Format 4 (PF4 or F4)
 Supportable UCI payload size: more than K bits (e.g., K=2)
 Number of OFDM symbols included in one PUCCH: Y to Z symbols (e.g., Y=4 and Z=14)
 Transmission structure: UCI and a DM-RS are configured/mapped in/to different symbols based on TDM. The DFT is applied to encoded UCI bits with no multiplexing between UEs.

FIG. 4 illustrates an ACK/NACK transmission process. Referring to FIG. 4, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.
 Frequency domain resource assignment: Indicates an RB set assigned to a PDSCH.
 Time domain resource assignment: Indicates K0 and the starting position (e.g., OFDM symbol index) and length (e.g., the number of OFDM symbols) of the PDSCH in a slot.
 PDSCH-to-HARQ_feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

1. Wireless Communication System Supporting Unlicensed Band

FIG. 5 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 5(a), the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 5(b). In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.
 Channel: a carrier or a part of a carrier composed of a contiguous set of RBs in which a channel access procedure (CAP) is performed in a shared spectrum.
 Channel access procedure (CAP): a procedure of assessing channel availability based on sensing before signal transmission in order to determine whether other communication node(s) are using a channel. A basic sensing unit is a sensing slot with a duration of $T_{sl}$=9 us. The BS or the UE senses the slot during a sensing slot duration. When power detected for at least 4 us within the sensing slot duration is less than an energy detection threshold $X_{thresh}$, the sensing slot duration $T_{sl}$ is be considered to be idle. Otherwise, the sensing slot duration $T_{sl}$ is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT. The COT may be shared for transmission between the BS and corresponding UE(s).

DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.

UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

FIG. 6 illustrates a resource occupancy method in a U-band. According to regional regulations for U-bands, a communication node in the U-band needs to determine whether a channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), the communication node may determine that the channel is busy if the detected channel energy is higher than the CCA threshold. Otherwise, the communication node may determine that the channel is idle. The Wi-Fi standard (802.11ac) specifies a CCA threshold of −62 dBm for non-Wi-Fi signals and a CCA threshold of −82 dBm for Wi-Fi signals. When it is determined that the channel is idle, the communication node may start the signal transmission in a UCell. The sires of processes described above may be referred to as Listen-Before-Talk (LBT) or a channel access procedure (CAP). The LBT, CAP, and CCA may be interchangeably used in this document.

Specifically, for DL reception/UL transmission in a U-band, at least one of the following CAP methods to be described below may be employed in a wireless communication system according to the present disclosure.

DL Signal Transmission Method in U-Band

The BS may perform one of the following U-band access procedures (e.g., CAPs) for DL signal transmission in a U-band.

(1) Type 1 DL CAP Method

In the Type 1 DL CAP, the length of a time duration spanned by sensing slots sensed to be idle before transmission(s) may be random. The Type 1 DL CAP may be applied to the following transmissions:

Transmission(s) initiated by the BS including (i) a unicast PDSCH with user plane data or (ii) a unicast PDCCH scheduling user plane data in addition to the unicast PDSCH with user plane data, or Transmission(s) initiated by the BS including (i) a discovery burst only or (ii) a discovery burst multiplexed with non-unicast information.

FIG. 7 is a flowchart illustrating CAP operations performed by a BS to transmit a DL signal in a U-band.

Referring to FIG. 7, the BS may sense whether a channel is idle for sensing slot durations of a defer duration $T_d$. Then, if a counter N is zero, the BS may perform transmission (S1234). In this case, the BS may adjust the counter N by sensing the channel for additional sensing slot duration(s) according to the following steps:

Step 1) (S1220) The BS sets N to $N_{init}$ (N=$N_{init}$), where $N_{init}$ is a random number uniformly distributed between 0 and $CW_p$. Then, step 4 proceeds.

Step 2) (S1240) If N>0 and the BS determines to decrease the counter, the BS sets N to N−1 (N=N−1).

Step 3) (S1250) The BS senses the channel for the additional sensing slot duration. If the additional sensing slot duration is idle (Y), step 4 proceeds. Otherwise (N), step 5 proceeds.

Step 4) (S1230) If N=0 (Y), the BS terminates the CAP (S1232). Otherwise (N), step 2 proceeds.

Step 5) (S1260) The BS senses the channel until either a busy sensing slot is detected within an additional defer duration $T_d$ or all the slots of the additional defer duration $T_d$ are detected to be idle.

Step 6) (S1270) If the channel is sensed to be idle for all the slot durations of the additional defer duration $T_d$ (Y), step 4 proceeds. Otherwise (N), step 5 proceeds.

Table 5 shows that $m_p$, a minimum contention window (CW), a maximum CW, a maximum channel occupancy time (MCOT), and an allowed CW size, which are applied to the CAP, vary depending on channel access priority classes.

TABLE 5

| Channel Access Priority Class (p) | $m_p$ | $CW_{min,p}$ | $CW_{max,p}$ | $T_{mcop}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |

TABLE 5-continued

| Channel Access Priority Class (p) | $m_p$ | $CW_{min,p}$ | $CW_{max,p}$ | $T_{mcotp}$ | allowed $CW_p$ sizes |
|---|---|---|---|---|---|
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The defer duration $T_d$ is configured in the following order: duration $T_f$ (16 us)+$m_p$ consecutive sensing slot durations $T_{sl}$ (9 us). $T_f$ includes the sensing slot duration $T_{sl}$ at the beginning of the 16-us duration.

The following relationship is satisfied: $CW_{min,p}<=CW_p<=CW_{max,p}$. $CW_p$ may be initially configured by $CW_p=CW_{min,p}$ and updated before step 1 based on HARQ-ACK feedback (e.g., ACK or NACK) for a previous DL burst (e.g., PDSCH) (CW size update). For example, $CW_p$ may be initialized to $CW_{min,p}$ based on the HARQ-ACK feedback for the previous DL burst. Alternatively, $CW_p$ may be increased to the next highest allowed value or maintained as it is.

(2) Type 2 DL CAP Method

In the Type 2 DL CAP, the length of a time duration spanned by sensing slots sensed to be idle before transmission(s) may be determined. The Type 2 DL CAP is classified into Type 2A/2B/2C DL CAPs.

The Type 2A DL CAP may be applied to the following transmissions. In the Type 2A DL CAP, the BS may perform transmission immediately after the channel is sensed to be idle at least for a sensing duration $T_{short\_dl}$=25 us. Here, $T_{short\_dl}$ includes the duration $T_f$ (=16 us) and one sensing slot duration immediately after the duration $T_f$, where the duration $T_f$ includes a sensing slot at the beginning thereof.

Transmission(s) initiated by the BS including (i) a discovery burst only or (ii) a discovery burst multiplexed with non-unicast information, or Transmission(s) by the BS after a gap of 25 us from transmission(s) by the UE within a shared channel occupancy.

The Type 2B DL CAP is applicable to transmission(s) performed by the BS after a gap of 16 us from transmission(s) by the UE within a shared channel occupancy time. In the Type 2B DL CAP, the BS may perform transmission immediately after the channel is sensed to be idle for $T_f$=16 us. $T_f$ includes a sensing slot within 9 us from the end of the duration. The Type 2C DL CAP is applicable to transmission(s) performed by the BS after a maximum of 16 us from transmission(s) by the UE within the shared channel occupancy time. In the Type 2C DL CAP, the BS does not perform channel sensing before performing transmission.

UL Signal Transmission Method in U-band

The UE may perform a Type 1 or Type 2 CAP for UL signal transmission in a U-band. In general, the UE may perform the CAP (e.g., Type 1 or Type 2) configured by the BS for UL signal transmission. For example, a UL grant scheduling PUSCH transmission (e.g., DCI formats 0_0 and 0_1) may include CAP type indication information for the UE.

(1) Type 1 UL CAP Method

In the Type 1 UL CAP, the length of a time duration spanned by sensing slots sensed to be idle before transmission(s) is random. The Type 1 UL CAP may be applied to the following transmissions.

PUSCH/SRS transmission(s) scheduled and/or configured by the BS

PUCCH transmission(s) scheduled and/or configured by the BS

Transmission(s) related to a Random Access Procedure (RAP)

FIG. 8 is a flowchart illustrating CAP operations performed by a UE to transmit a UL signal.

Referring to FIG. 8, the UE may sense whether a channel is idle for sensing slot durations of a defer duration $T_d$. Then, if a counter N is zero, the UE may perform transmission (S1534). In this case, the UE may adjust the counter N by sensing the channel for additional sensing slot duration(s) according to the following steps:

Step 1) (S1520) The UE sets N to $N_{init}$ (N=$N_{init}$), where $N_{init}$ is a random number uniformly distributed between 0 and $CW_p$. Then, step 4 proceeds.

Step 2) (S1540) If N>0 and the UE determines to decrease the counter, the UE sets N to N−1 (N=N−1).

Step 3) (S1550) The UE senses the channel for the additional sensing slot duration. If the additional sensing slot duration is idle (Y), step 4 proceeds. Otherwise (N), step 5 proceeds.

Step 4) (S1530) If N=0 (Y), the UE terminates the CAP (S1532). Otherwise (N), step 2 proceeds.

Step 5) (S1560) The UE senses the channel until either a busy sensing slot is detected within an additional defer duration $T_d$ or all the slots of the additional defer duration $T_d$ are detected to be idle.

Step 6) (S1570) If the channel is sensed to be idle for all the slot durations of the additional defer duration $T_d$ (Y), step 4 proceeds. Otherwise (N), step 5 proceeds.

Table 6 shows that $m_p$, a minimum CW, a maximum CW, an MCOT, and an allowed CW size, which are applied to the CAP, vary depending on channel access priority classes.

TABLE 6

| Channel Access Priority Class (p) | $m_p$ | $CW_{min,p}$ | $CW_{max,p}$ | $T_{ulmcotp}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The defer duration $T_d$ is configured in the following order: duration $T_f$(16 us)+$m_p$ consecutive sensing slot durations $T_{sl}$ (9 us). $T_f$ includes the sensing slot duration $T_{sl}$ at the beginning of the 16-us duration.

The following relationship is satisfied: $CW_{min,p} \leq CW_p \leq CW_{max,p}$. $CW_p$ may be initially configured by $CW_p = CW_{min,p}$ and updated before step 1 based on an explicit/implicit reception response for a previous UL burst (e.g., PUSCH) (CW size update). For example, $CW_p$ may be initialized to $CW_{min,p}$ based on the explicit/implicit reception response for the previous UL burst. Alternatively, $CW_p$ may be increased to the next highest allowed value or maintained as it is.

(2) Type 2 UL CAP Method

In the Type 2 UL CAP, the length of a time duration spanned by sensing slots sensed to be idle before transmission(s) may be determined. The Type 2 UL CAP is classified into Type 2A/2B/2C UL CAPs. In the Type 2A UL CAP, the UE may perform transmission immediately after the channel is sensed to be idle at least for a sensing duration $T_{short\_dl}$=25 us. Here, $T_{short\_dl}$ includes the duration $T_f$(=16 us) and one sensing slot duration immediately after the duration $T_f$. In the Type 2A UL CAP, $T_f$ includes a sensing slot at the beginning thereof. In the Type 2B UL CAP, the UE may perform transmission immediately after the channel is sensed to be idle for the sensing duration $T_f$=16 us. In the Type 2B UL CAP, $T_f$ includes a sensing slot within 9 us from the end of the duration. In the Type 2C UL CAP, the UE does not perform channel sensing before performing transmission.

RB Interlace

FIG. 9 illustrates an RB interlace. In a shared spectrum, a set of inconsecutive RBs (at the regular interval) (or a single RB) in the frequency domain may be defined as a resource unit used/allocated to transmit a UL (physical) channel/signal in consideration of regulations on occupied channel bandwidth (OCB) and power spectral density (PSD). Such a set of inconsecutive RBs is defined as the RB interlace (or interlace) for convenience.

Referring to FIG. 9, a plurality of RB interlaces (interlaces) may be defined in a frequency bandwidth. Here, the frequency bandwidth may include a (wideband) cell/CC/BWP/RB set, and the RB may include a PRB. For example, interlace #m∈{0, 1, . . . , M−1} may consist of (common) RBs {m, M+m, 2M+m, 3M+m, . . . }, where M represents the number of interlaces. A transmitter (e.g., UE) may use one or more interlaces to transmit a signal/channel. The signal/channel may include a PUCCH or PUSCH.

3. PUCCH Transmission in U-band

The above descriptions (NR frame structure, RACH, U-band system, etc.) are applicable in combination with methods proposed in the present disclosure, which will be described later. Alternatively, the descriptions may clarify the technical features of the methods proposed in the present disclosure.

In addition, PRACH preamble design methods to be described later may be related to UL transmission, and thus, the methods may be equally applied to the above-described UL signal transmission methods in U-band systems. To implement the technical idea of the present disclosure, the corresponding systems, the terms, expressions, and structures in this document may be modified to be suitable for the systems.

For example, UL transmission based on the following PUCCH transmission methods may be performed on an L-cell and/or U-cell defined in the U-band systems.

As described above, the Wi-Fi standard (802.11ac) specifies a CCA threshold of −62 dBm for non-Wi-Fi signals and a CCA threshold of −82 dBm for Wi-Fi signals. In other words, a station (STA) or access point (AP) of the Wi-Fi system may transmit no signal in a specific band if the STA or AP receives a signal from a device not included in the Wi-Fi system in the specific band at a power of −62 dBm or higher.

In this document, the term 'U-band' may be interchangeably used with the terms 'shared spectrum'.

As in Table 4 described above, the PUCCH formats in the legacy NR system include 5 PUCCH formats from PUCCH format 0 to PUCCH format 4. PUCCH formats 0, 1, and 4 are configured to occupy one PRB, and PUCCH formats 2 and 3 are configured to occupy 1 to 16 PRBs in OFDM symbols.

FIG. 10 illustrates sequence generation in PUCCH format 0. As described above, UCI of PUCCH format 0 is transmitted by sequence selection with a maximum of 2 bits. If the UCI is transmitted in 2 symbols in PUCCH format 0, the UCI bits may be repeated over 2 symbols. In the legacy NR system, only a length-12 computer generating sequence (CGS) has been used. One sequence is selected from a set of sequences. In regard to HARQ-ACK transmission, the set of sequences is composed of N cyclic shifts (CSs) in a PRB. The distance between two adjacent CSs in the PRB is 12/N.

UCI of PUCCH format 1 is transmitted with a maximum of 2 bits through sequence modulation. In the legacy NR system, only a length-12 CGS has been used. A symbol modulated by binary phase shift keying (BPSK)/quadrature phase shift keying (QPSK) may be multiplied by the sequence. UCI and a DM-RS are multiplexed by a TDM method, and the density of the DM-RS is ½. The DM-RS is located in all even symbols. The CGS is also used for a DM-RS sequence. Frequency hopping may be activated or deactivated. FIG. 11 illustrates an example of frequency hopping in PUCCH format 1. Block-wise spreading may be applied by a time division-orthogonal cover code (TD-OCC) having a multiplexing capacity as illustrated in FIG. 12.

Hereinafter, a PUCCH format used for the shared spectrum is proposed. When a specific device (and/or node) transmits a signal in the shared spectrum, there may be restrictions in terms of power spectral density (PSD). For example, according to ETSI regulations, signal transmission in a specific band should satisfy a PSD of 10 dBm/1 MHz. If a PUCCH is transmitted in PUCCH format 0 (1 PRB, 180 kHz) when an SCS of 15 kHz is configured, a maximum allowable power for the PUCCH may be about 10 dBm. In general, the maximum power of a UE is 23 dBm, and 10 dBm corresponds to an allowable power significantly lower than 23 dBm. When the UE transmits a UL signal at 10 dBm, maximum UL coverage supportable by the UE may be reduced. If the UE increases transmission power by transmitting the PUCCH in a wider frequency domain (F-domain), this may be helpful to solve the problem in which UL coverage is reduced. As regulations on the shared spectrum, there may be restrictions in terms of occupied channel bandwidth (OCB). For example, when a specific device transmits a signal, the signal may have to occupy at least 80% of a system bandwidth. If the system bandwidth is 20 MHz, the signal transmitted by the specific device may have to occupy more than 16 MHz, which is 80% of 20 MHz.

As the structure of the PUCCH considering regulations on PSD and OCB, the above-described RB interlace structure may be used. For example, the PUCCH may be configured by repeating a PUCCH sequence of the PUCCH configured conventionally to use one PRB, as in PUCCH formats 0 and/or 1, in PRBs which are separated at a specific interval, on the frequency domain in consideration of OCB. When the PUCCH is transmitted through the RB interlace, the same PUCCH sequence is repeatedly transmitted. Through repeated transmission, peak-to-average power ratio (PAPR) and cubic metric (CM) values may be increased. The lower the PAPR and CM values are, the better transmission performance may be. Hereinafter, methods of selecting a CS value and/or a phase shift (PS) value of a PUCCH sequence for each repeated transmission in consideration of the PAPR and the CM when the PUCCH is transmitted through an RB interlace in the frequency domain are proposed. Although the present specification is described with reference to the PUCCH sequence for convenience, the operation of each embodiment of the present disclosure may be applied even to other UL signals and/or channels which are transmitted through repeated mapping of the sequence to RBs in the interlace by replacing the PUCCH sequence with a sequence for other signals and/or channels.

In addition, the methods proposed in this specification may be applied to use cases other than an NR U-band. As an example of another use case, the methods proposed in this specification may be used in an NR-based non-terrestrial network (NTN).

3.1. Embodiment 1

When a short sequence is repeatedly transmitted in a frequency band, a PS for obtaining a low PAPR/CM may be considered. When a plurality of sequences is repeatedly transmitted in a frequency band, one PS value among [1, 1i, −1, −1i] may be selected so that a phase of each sequence may be shifted. According to experimental results, when phases of repetitively transmitted sequences are shifted, a meaningfully lower PAPR/CM value is obtained in the case in which the number of repeatedly transmitted sequences is a prime number than in the other cases.

The experimental results when the number of repetitively transmitted sequences is N are described below.

Sequences used in the experiment are length-12 CGS sequences, which are used in NR PUCCH formats 0 and 1. The sequences used in the experiment consist of a total of 30 as illustrated in FIG. 13. When obtaining an actual PAPR/CM value, all results performed for 30 candidates by the number of iterations were collected using a cumulative distribution function (CDF), and then values located at the 95%-tile of the CDF were obtained.

In mapping of the sequences used in the experiment in the frequency domain, the length-12 sequences maintain an interval of 10 RBs based on a starting RB. For example, when N is 10, a length-12 sequence is mapped to the first RB, and the second length-12 sequence is mapped to a place separated by 10 RBs. This is illustrated as in the figure. Characteristically, if N is 10, 10 sequences are discontinuously mapped over a frequency band of a total of 91 RBs.

In the PAPR/CM experiment, the phase of the first sequence was fixed and, in this state, the phases of the remaining sequences were configured to select one of [1, 1i, −1, −1i]. PAPR and CM values obtained as the experimental results are illustrated in FIGS. 15 to 23 according to the value of N.

As illustrated in FIGS. 15 to 23, PAPR/CM values corresponding to 4 higher phase shift patterns when N is a prime number (i.e., 3, 5, 7, or 11) are derived as meaningfully low values as compared with PAPR/CM values when N is not a prime number. The 4 phase shift patterns are divided into a pattern consisting only of 1 and −1 (i.e., 0° and 180°), a pattern including 1, −1, and 1i, a pattern including 1, −1, and −1i. and a pattern including all of 1, 1i, −1, and −1i.

Figure 24:
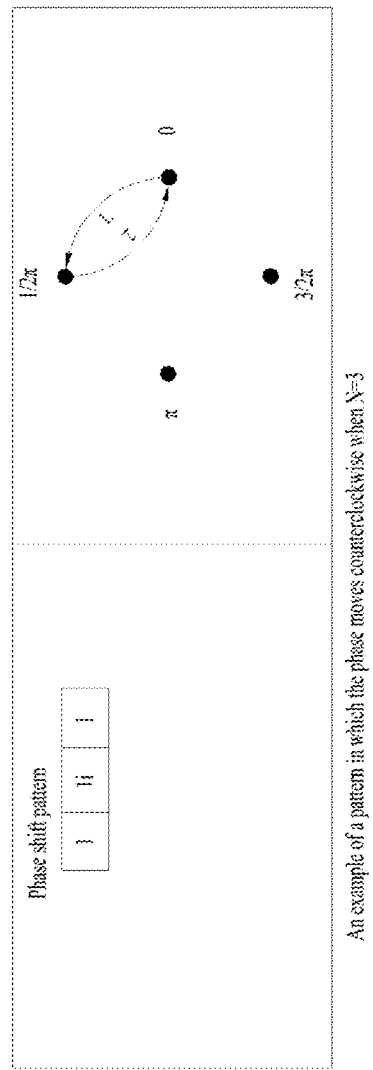
Figure 25:
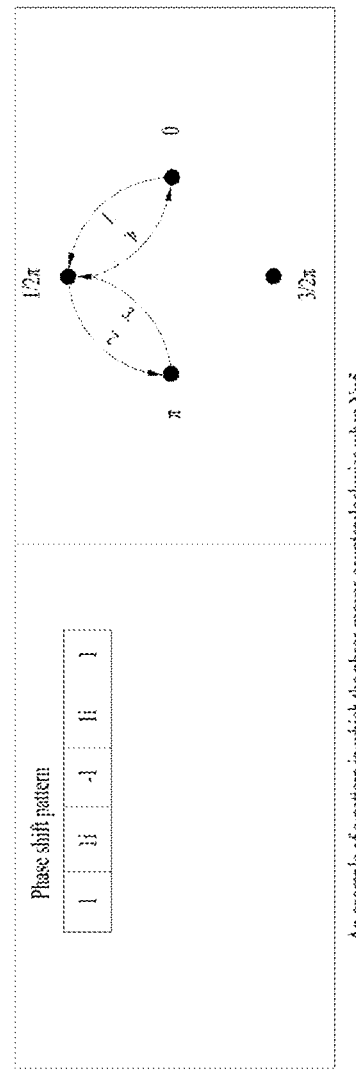
Figure 26:
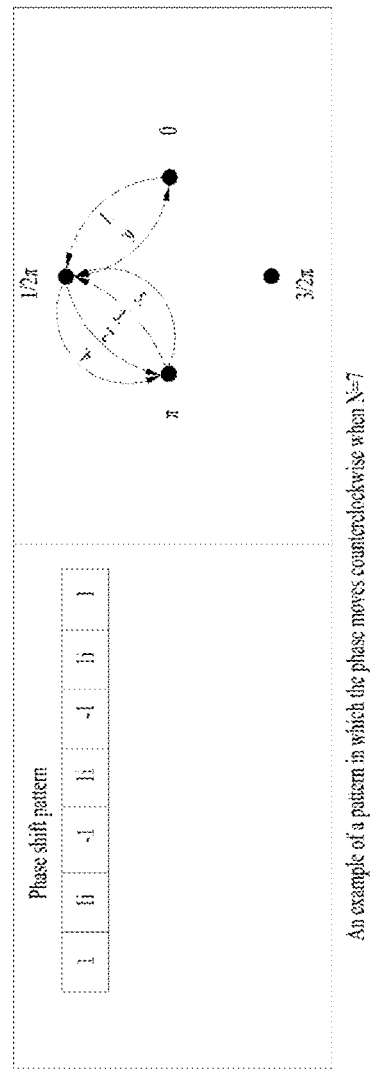
Figure 27:
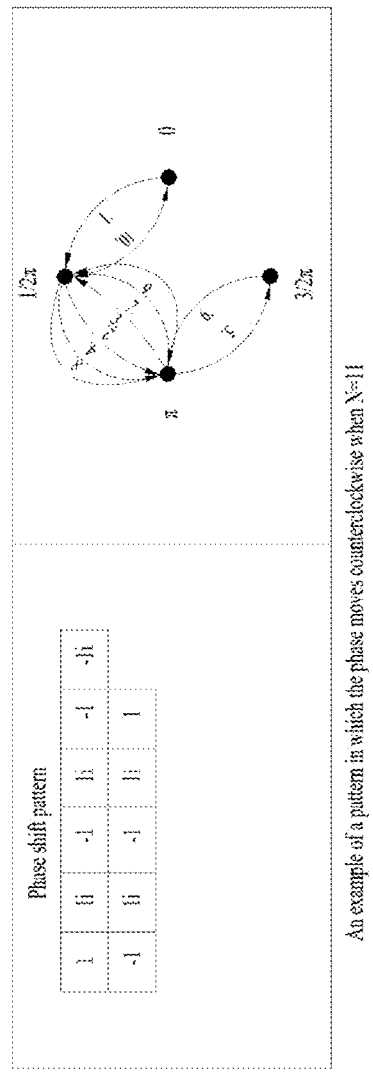
Figure 28:
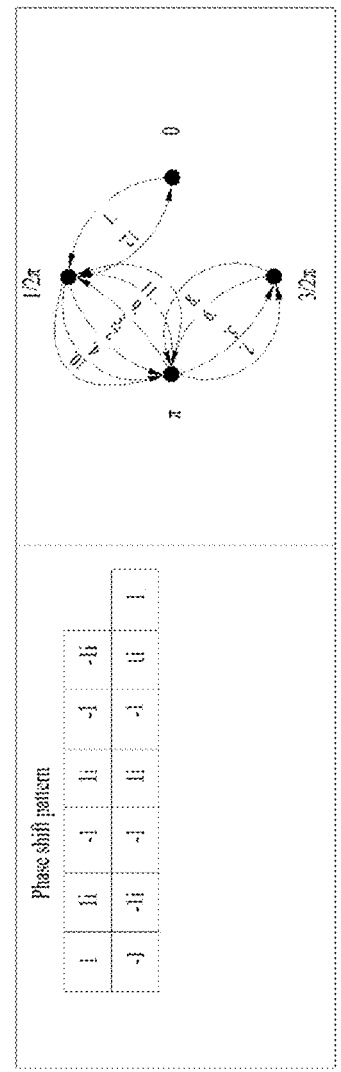
Figure 29:
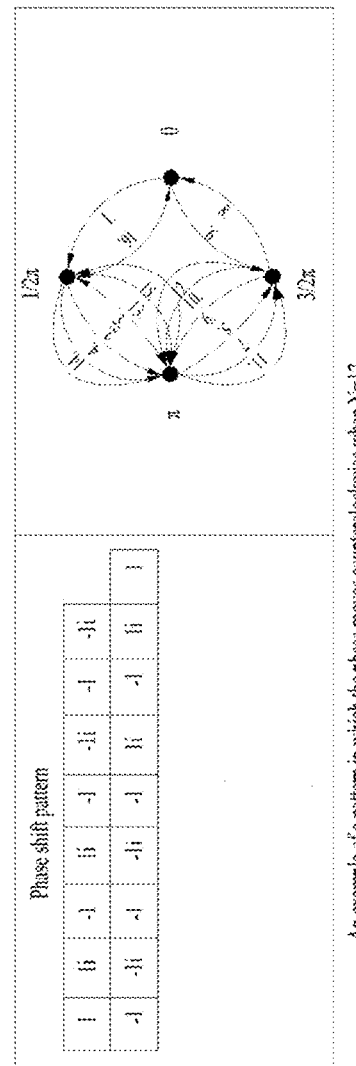
Figure 30:
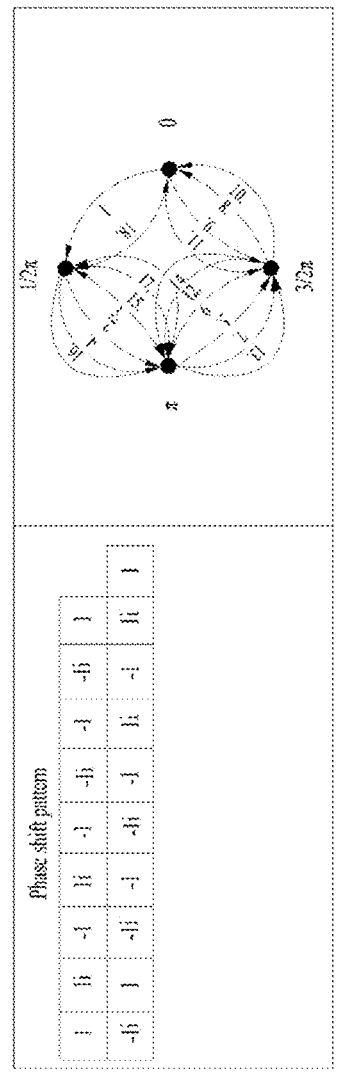
Figure 31:
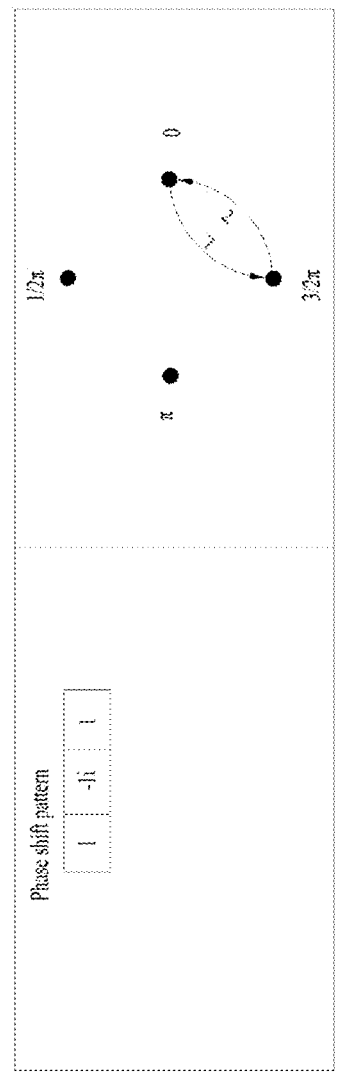
Figure 32:
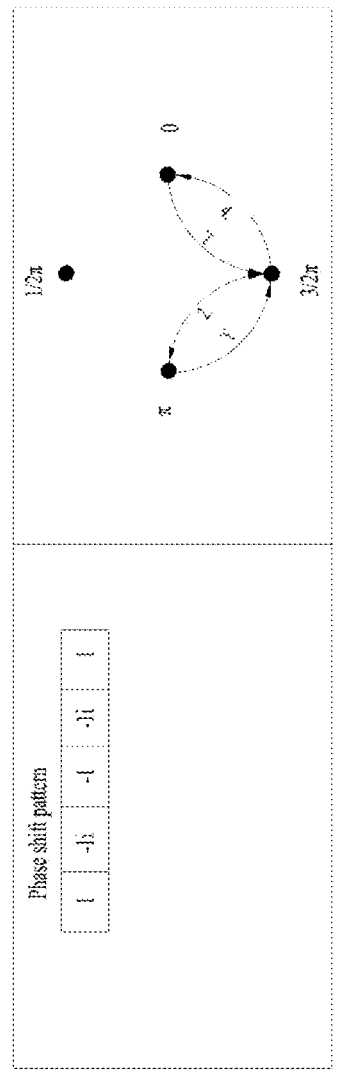
Figure 33:
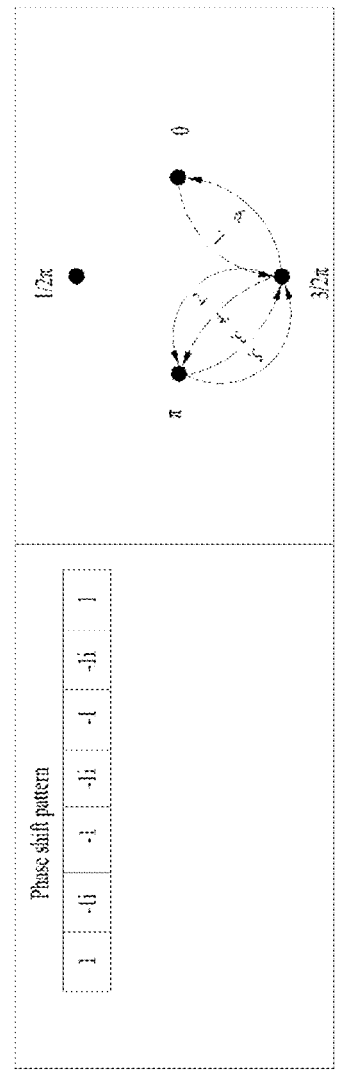
Figure 34:
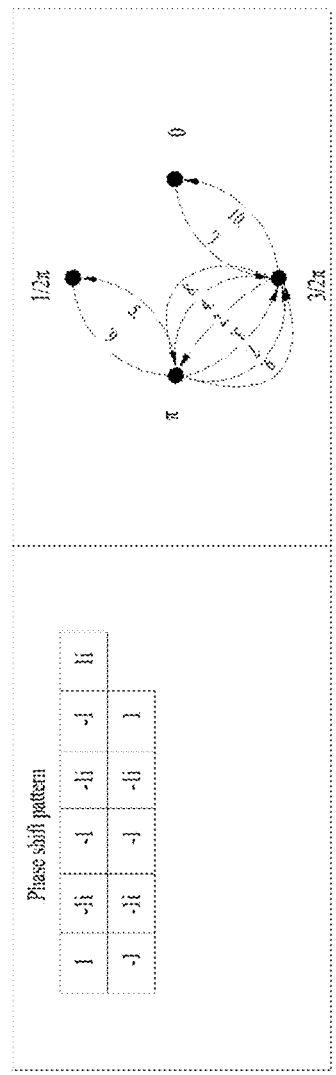
Figure 35:
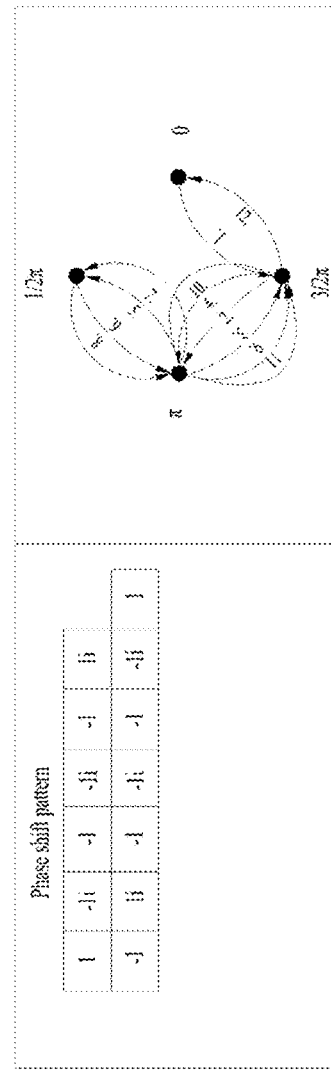
Figure 36:
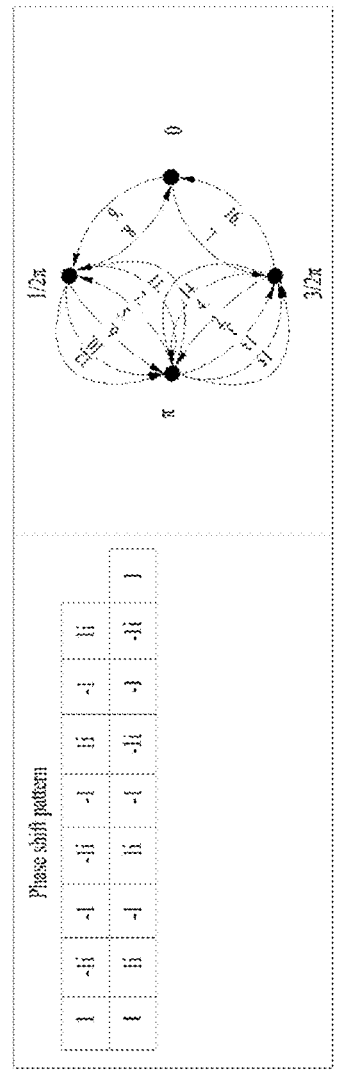
Figure 37:
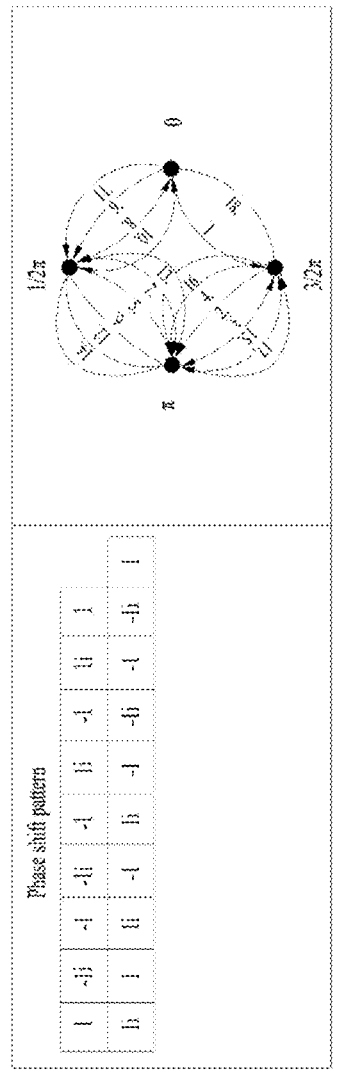

First, the pattern consisting of all of 1, 1i, −1, and −1i has characteristics as illustrated in FIG. 24 according to the value of N. In addition, for prime numbers larger than or equal to 3, if the phase of one of two patterns has the characteristic of moving in a counterclockwise direction, the phase of the other pattern has the characteristic of moving in the clockwise direction. Examples of patterns in which a phase moves in a counterclockwise direction according to the value of N are illustrated in FIGS. 24 to 30. On the other hand, examples of patterns in which a phase moves in a clockwise direction according to the value of N are illustrated in FIGS. 31 to 37.

Second, the pattern consisting of 1 and −1 has the characteristics as illustrated in Table 7 according to the value of N. While, in the first pattern, the number of repetitions of the same value appears as abcde . . . , from the front, in the second pattern, the number of repetitions of the same value appears as abcde . . . , from the back. For example, when N is 11, in pattern #1, 1 and −1 are respectively repeated 3 times and 3 times, 1 time and 2 times, and 1 time and 1 time, from the front. That is, pattern #1 becomes 331211. In pattern #2, 1 and −1 are respectively repeated 3 times and 3 times, 1 time and 2 times, and 1 time and 1 time, from the back. That is, pattern #2 becomes 331211, which is equal to pattern #1. These characteristics appear equally for other values of N.

In other words, the pattern for the number of repetitions of the same PS value in pattern #1 is 331211, and the pattern for the number of repetitions of the same PS value in pattern #2 is 112133. Consequently, the patterns of the number of repetitions of the same PS value are symmetrical to each other.

TABLE 7

| N | #1 pattern | #2 pattern |
|---|---|---|
| 3 | [1, 1, −1] | [1, −1, −1] |
| 5 | [1, 1, 1, −1, 1] | [1, −1, 1, 1, 1] |
| 7 | [1, 1, 1, −1, −1, 1, −1] | [1, −1, 1, 1, −1, −1, −1] |
| 11 | [1, 1, 1, −1, −1, −1, 1, −1, −1, 1, −1] | [1, −1, 1, 1, −1, 1, 1, 1, −1, −1, −1] |
| 13 | [1, 1, 1, −1, −1, −1, 1, 1, −1, 1, 1, −1, 1] | [1, −1, 1, 1, −1, 1, 1, −1, −1, −1, 1, 1, 1] |

The proposed phase shift patterns characteristically appear when the number of repeatedly transmitted sequences is a prime number and aid in improving PAPR/CM performance. Therefore, when it is necessary to determine the number of repeatedly transmitted sequences, the prime number may be selected according to the above proposal. According to the selected prime value, one of the above proposed phase shift patterns may be selected, so that a sequence with a low PAPR/CM may be configured and/or transmitted.

FIG. 38 illustrates an example of transmission of a UL signal according to the present disclosure.

Referring to FIG. 38, a UE may generate UL sequences (S102). The UL sequences may include repeated short (e.g., 3 RBs or less, desirably, a length corresponding to 1 RB) UL sequences. A phase shift pattern may be applied to each of the short UL sequences in units of short UL sequences. For example, the short UL sequence may include a sequence (within 1 OFDM symbol) of PUCCH format 0 or 1. Here, the number of short UL sequences may be a prime number. When the number of short UL sequences is 11, the phase shift pattern may be obtained based on at least one of the following patterns. Desirably, the phase shift pattern may be given as at least one of patterns in Table 8 below.

TABLE 8

| $[a_0, a_1, a_2, a_3, a_4, a_5, a_6, a_7, a_8, a_9, a_{10}]$ |
|---|
| [1, 1, 1, −1, −1, −1, 1, −1, −1, 1, −1] |
| [1, −1, 1, 1, −1, 1, 1, 1, −1, −1, −1] |
| [1, i, −1, i, −1, −i, −1, −i, −1, i, −1, i, 1] |
| [1, −i, −1, −i, −1, i, −1, i, −1, −i, −1, −i, 1] |

Next, the UL sequences may be mapped to discontinuous frequency resources (S104). Here, the discontinuous frequency resources may be composed of frequency resources separated at equal intervals in the frequency domain. For example, the discontinuous frequency resource may include interlaced (P)RBs. Thereafter, the UE may transmit the mapped UL sequences (S106). Here, step S106 may be performed using a resource mapper 1050 and a signal generator 1060 of FIG. 48 to be described later. The signal generator 1060 may generate OFDM symbols from the UL sequences mapped to the frequency resources through IFFT.

FIG. 39 illustrates an example of reception of a UL signal according to the present disclosure.

Referring to FIG. 39, a BS may receive UL sequences (S102). The UL sequences may include repeated short (e.g., 3 RBs or less, desirably, a length corresponding to 1 RB) UL sequences. A phase shifted pattern may be applied to each of the short UL sequences in units of short UL sequences. For example, the short UL sequence may include a sequence (within 1 OFDM symbol) of PUCCH format 0 or 1. Here, the number of short UL sequences may be a prime number. When the number of short UL sequences is 11, the phase shifted pattern may be obtained based on at least one of patterns of Table 9. Desirably, the phase shifted pattern may be given as at least one of the patterns in Table 9 below.

TABLE 9

| $[a_0, a_1, a_2, a_3, a_4, a_5, a_6, a_7, a_8, a_9, a_{10}]$ |
|---|
| [1, 1, 1, −1, −1, −1, 1, −1, −1, 1, −1] |
| [1, −1, 1, 1, −1, 1, 1, 1, −1, −1, −1] |
| [1, i, −1, i, −1, −i, −1, −i, −1, i, −1, i, 1] |
| [1, −i, −1, −i, −1, i, −1, i, −1, −i, −1, −i, 1] |

Next, a plurality of short UL sequences may be de-mapped from discontinuous frequency resources (S204). Here, the discontinuous frequency resources may be composed of frequency resources separated at equal intervals in the frequency domain. For example, the discontinuous frequency resource may include interlaced (P)RBs. Thereafter, the BS may attempt to detect/decode a UL signal by combining the de-mapped short UL sequences (S206).

FIG. 40 illustrates resource mapping of UL sequences. Operation described in FIG. 40 corresponds to operation of the frequency mapper 1050 of FIG. 48.

Referring to FIG. 40, short UL sequences S may be mapped to interlaced (P)RBs in the frequency domain. The interlaced (P)RBs are composed of (P)RBs separated at an equal interval in the frequency domain. The short UL sequences S are repeatedly transmitted in the frequency domain, and a phase shift pattern [a, b, c, d, e] may be applied to the short UL sequences S in units of (P)RBs (or in units of short UL sequences). When the number of short UL sequences is 11, the phase shift pattern may be obtained based on at least one of the following patterns. Desirably, the phase shift pattern may be given as at least one of patterns in Table 10. In this case, [a, b, c, d, e] may correspond to [a0, a1, a2, a3, . . . , a10] or [a10, a9, a8, a7, . . . , a0].

TABLE 10

| $[a_0, a_1, a_2, a_3, a_4, a_5, a_6, a_7, a_8, a_9, a_{10}]$ |
|---|
| [1, 1, 1, −1, −1, −1, 1, −1, −1, 1, −1] |
| [1, −1, 1, 1, −1, 1, 1, 1, −1, −1, −1] |
| [1, i, −1, i, −1, −i, −1, −i, −1, i, −1, i, 1] |
| [1, −i, −1, −i, −1, i, −1, i, −1, −i, −1, −i, 1] |

Additionally, application of the sequence configuration methods proposed through Embodiment 3.1 is not limited to a PUCCH signal configuration, the principles/methods proposed in the present disclosure may be applied in the same/similar manner to one UL channel/signal (e.g., a DM-RS signal used for PUSCH demodulation, a DM-RS signal used for PUCCH demodulation, a PRACH preamble, a sequence constituting an SRS signal, or a PUSCH) configured by a plurality of (short) sequences.

Additionally, in configuring one signal/channel in a form of repeating/mapping a plurality of sequences (at the same time and/or in the same symbol) (adjacently or discontinuously) in the frequency domain, (1) the phase shifted pattern proposed in the present disclosure may be applied and/or UL transmission may be performed, in a state in which the number of the sequences is set to a prime number, or (2) the phase shifted pattern proposed in the present disclosure may be applied to perform UL transmission when the number of corresponding sequences is set to a prime number.

Meanwhile, a signal/channel consisting of the sequences may include the following signal.

A. Synchronization signal (e.g. PSS/SSS transmitted by gNB in DL or by UE in SL)

B. Reference signal (e.g. DMRS for control or data channels in DL or UL or SL, CSI-RS/TRS/PT-RS in DL, SRS in UL)

C. Control channel (e.g. DMRS-less control channel in DL or UL or SL)

D. Random access channel (e.g. PRACH preamble/format in UL)

Additionally, in a state in which a single channel (e.g., a PUCCH) and/or a signal (e.g., a DM-RS) is configured by a single sequence, different CSs and/or PSs (different combinations of CSs and/or PSs) may be applied to a plurality of channels/signals (sequences configured thereby). That is, one UE may simultaneously transmit (at the same time) a plurality of channels/signals (configured by sequences) to which different CSs and/or PSs (different combinations of CSs and/or PSs) are applied.

While the embodiments of the present disclosure have been described based on UL, the embodiments may be applied when any channel/signal is repeatedly transmitted in the frequency domain even in a DL situation. For example, the embodiments of the present disclosure may be applied when wake-up signal (WUS) sequences are subjected to frequency division multiplexing (FDM) (for a specific purpose such as UE grouping) in enhanced machine-type communication (eMTC)/narrowband Internet of Things (NB-IoT). Since a WUS is a DL signal (from the BS to the UE), a transmitter and a receiver are changed as compared with the case in which PUCCH transmission proposed above is performed. Accordingly, in the embodiments of the present disclosure, the BS may perform the operation described as being performed by the UE, and the UE may perform the operation described as being performed by the BS.

In addition, the principles/operations/methods proposed in the embodiments of the present disclosure may be applied in the same/similar manner even to the case in which sequences used for communication between UEs (e.g. device-to-device (D2D) communication) via sidelink (SL) and/or sequences used for vehicle-to-everything (V2X) communication, and a channel (e.g. feedback channel) and/or a signal (e.g., DM-RS) configured by the sequences are configured/mapped/transmitted.

While the embodiments of the present disclosure have been described based on the CGS, the embodiments may be applied to an environment in which a general sequence is used. For example, when a base sequence is an M-sequence, the embodiments of the present disclosure may be applied by changing an initial value of a linear feedback shift register (LFSR) instead of changing a root index of a Zadoff-Chu (ZC) sequence. Obviously, the methods proposed through the embodiments of the present disclosure are applicable to a cyclic shift of the M-sequence.

Examples of the above-described proposed methods may also be included as one of implementation methods of the present disclosure and, therefore, it is obvious that the examples are regarded as the proposed methods. In addition, although the above-described proposed methods may be independently implemented, the proposed methods may be implemented in the form of a combination (or aggregate) of some of the proposed methods. A rule may be defined such that the BS informs the UE of information as to whether the proposed methods are applied (or information about rules of the proposed methods) through a predefined signal (e.g., a physical layer signal or a higher layer signal).

The methods, embodiments, or descriptions for implementing the method proposed in this specification may be applied separately or in combination of one or more methods (or embodiments or descriptions).

Network Initial Access and Communication Processes

The UE may perform a network access process to perform the above-described/proposed procedures and/or methods. For example, the UE may receive and store system information and configuration information required to perform the above-described/proposed procedures and/or methods in a memory while accessing the network (e.g., BS). The configuration information required for the present disclosure may be received through higher layer signaling (e.g., RRC layer signaling, MAC layer signaling, etc.).

FIG. 41 is a diagram illustrating an initial network access process and subsequent communication processes. In NR, a physical channel and a reference signal may be transmitted by beamforming. When beamforming-based signal transmission is supported, a beam management process may be performed to align beams between the BS and UE. Further, a signal proposed in the present disclosure may be transmitted/received by beamforming. In the RRC IDLE mode, beam alignment may be performed based on a synchronization signal block (SSB), whereas in the RRC CONNECTED mode, beam alignment may be performed based on a CSI-RS (in DL) and an SRS (in UL). When beamforming-based signal transmission is not supported, beam-related operations may be skipped in the following description.

Referring to FIG. 41, the BS may periodically transmit an SSB (S702). The SSB may include a PSS/SSS/PBCH. The SSB may be transmitted by beam sweeping. Subsequently, the BS may transmit RMSI and other system information (OSI) (S704). The RMSI may include information (e.g., PRACH configuration information) required for the UE to initially access the BS. The UE may identify the best SSB after performing SSB detection. The UE may transmit a random access channel (RACH) preamble (Message 1 (Msg1)) to the BS on a PRACH resource linked/corresponding to the index (i.e., beam) of the best SSB (S706). The beam direction of the RACH preamble is associated with the PRACH resource. The association between the SSB (index) and the PRACH resource (and/or RACH preamble) may be configured by system information (e.g., RMSI). Thereafter, as a part of a RACH procedure, the BS may transmit a random access response (RAR) (Msg2) in response to the RACH preamble (S708), and the UE may transmit Msg3 (e.g., RRC Connection Request) using a UL grant in the RAR (S710). The BS may transmit a contention resolution message (Msg4) (S712). Msg4 may include an RRC Connection Setup message.

When the BS and UE establish an RRC connection through the RACH procedure, the BS and UE may perform subsequent beam alignment based on an SSB/CSI-RS (in DL) and an SRS (in UL). For example, the UE may receive the SSB/CSI-RS (S714). The UE may use the SSB/CSI-RS to generate a beam/CSI report. The BS may request the beam/CSI report from the UE through DCI (S716). In this case, the UE may generate the beam/CSI report based on the SSB/CSI-RS and transmit the generated beam/CSI report to the BS on a PUSCH/PUCCH (S718). The beam/CSI report may include a beam measurement result, information about a preferred beam, and so on. The BS and UE may switch beams based on the beam/CSI report (S720a and S720b).

Thereafter, the UE and BS may perform the above-described/proposed procedures and/or methods. For example, each of the UE and BS may transmit a radio signal by processing information stored in a memory or store a received radio signal in the memory after processing the radio signal according to the proposals of the present disclosure, based on configuration information obtained from the network access process (e.g., system information acquisition process, RRC connection process based on an RACH, and so on). In the case of DL, the radio signal may include at least one of a PDCCH, a PDSCH, or an RS, and in the case of UL, the radio signal may include at least one of a PUCCH, a PUSCH, or an SRS on UL.

Discontinuous Reception (DRX) Operation

The UE may perform a DRX operation, while performing the afore-described/proposed procedures and/or methods. A UE configured with DRX may reduce power consumption by discontinuously receiving a DL signal. DRX may be performed in an RRC_IDLE state, an RRC_INACTIVE state, and an RRC_CONNECTED stated. DRX is used for discontinuous reception of a paging signal in the RRC_IDLE state and the RRC_INACTIVE state. Now, DRX performed in the RRC_CONNECTED state (RRC_CONNECTED DRX) will be described below.

FIG. 42 is a diagram illustrating a DRX cycle (RRC_CONNECTED state).

Referring to FIG. 42, the DRX cycle includes On Duration and Opportunity for DRX. The DRX cycle defines a time interval in which On Duration is periodically repeated. On Duration is a time period during which the UE monitors to receive a PDCCH. When DRX is configured, the UE performs PDCCH monitoring during the On Duration. When there is any successfully detected PDCCH during the PDCCH monitoring, the UE operates an inactivity timer and is maintained in an awake state. On the other hand, when there is no successfully detected PDCCH during the PDCCH monitoring, the UE enters a sleep state, when the On Duration ends. Therefore, if DRX is configured, PDCCH monitoring/reception may be performed discontinuously in the time domain, when the afore-described/proposed procedures and/or methods are performed. For example, if DRX is configured, PDCCH reception occasions (e.g., slots having PDCCH search spaces) may be configured discontinuously according to a DRX configuration in the present disclosure. On the contrary, if DRX is not configured, PDCCH monitoring/reception may be performed continuously in the time domain, when the afore-described/proposed procedures and/or methods are performed. For example, if DRX is not configured, PDCCH reception occasions (e.g., slots having PDCCH search spaces) may be configured continuously in the present disclosure. PDCCH monitoring may be limited in a time period configured as a measurement gap, irrespective of whether DRX is configured.

Table 11 describes a UE operation related to DRX (in the RRC_CONNECTED state). Referring to Table 11, DRX configuration information is received by higher-layer (RRC) signaling, and DRX ON/OFF is controlled by a DRX command of the MAC layer. Once DRX is configured, the UE may perform PDCCH monitoring discontinuously in performing the described/proposed procedures and/or methods according to the present disclosure, as illustrated in FIG. 20.

TABLE 11

|  | Type of signals | UE procedure |
| --- | --- | --- |
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the length of the starting duration of a DRX cycle.
Value of drx-InactivityTimer: defines the length of a time duration in which the UE is in the awake state after a PDCCH occasion in which a PDCCH indicating initial UL or DL data has been detected.
Value of drx-HARQ-RTT-TimerDL: defines the length of a maximum time duration from reception of a DL initial transmission to reception of a DL retransmission.
Value of drx-HARQ-RTT-TimerDL: defines the length of a maximum time duration from reception of a grant for a DL initial transmission to reception of a grant for a UL retransmission.
drx-LongCycleStartOffset: defines the time duration and starting time of a DRX cycle.
drx-ShortCycle (optional): defines the time duration of a short DRX cycle.

When at least one of drx-OnDurationTimer, drx-InactivityTimer, drx-HARQ-RTT-TimerDL, or drx-HARQ-RTT-TimerDL is running, the UE performs PDCCH monitoring in each PDCCH occasion, while staying in the awake state.

Before performing the operations described in each embodiment of the present disclosure, the UE may perform the above-described DRX related operation. If the UE performs PDCCH monitoring during the On Duration and successfully detects a PDCCH while performing the PDCCH monitoring, the UE may perform at least one of the PUSCH scheduling related operations according to embodiments of the present disclosure.

Implementation Examples

FIG. 43 is a flowchart illustrating a signal transmission/reception method according to embodiments of the present disclosure.

Referring to FIG. 43, embodiments of the present disclosure may be performed by the UE and may include repeatedly mapping a sequence for a UL signal to RBs in an interlace (S4301) and transmitting the UL signal on the interface (S4303). Specifically, the number of the RBs constituting the interlace may be a prime number. For example, as described through Embodiment 1 and FIGS. 15 to 23, when the number of the RBs is a prime number, there are advantages in terms of a PAPR and a CM. While FIGS. 15 to 23 illustrate only the experimental results when the number N of the RBs constituting the interlace is 3 to 11, advantages are obtained in terms of the PAPR and the CM even when N further increases if the number of the RBs constituting the interlace is a prime number. Accordingly, N may be selected from among prime numbers 3, 5, 7, 11, 13, 17, 19, 23, 29, 31, . . . without limitation. However, since N that may be selected is less than or equal to the number of RBs present in a bandwidth, N may be a prime number less than or equal to the total number of RBs in an available bandwidth.

The sequence for the UL signal may be repeatedly mapped based on a phase shift pattern. The phase shifted pattern corresponds to a pattern of PS values for the RBs, as described and illustrated in Embodiment 1 and FIGS. 15 to 23.

For example, when the number of RBs in the interlace is N=7 as illustrated in FIG. 21, the phase shifted pattern may be one of the higher four phase shift patterns based on the PAPR and the CM. As a specific example, the phase shifted pattern may be [1, 1, 1, −1, −1, 1, −1] which is the first pattern of FIG. 19. Alternatively, the phase shift pattern may be one of the second to fourth patterns of FIG. 19. Alternatively, when N=11 as illustrated in FIG. 23, the phase shift pattern may be one of the higher four phase shifted patterns based on the PAPR and the CM. As a specific example, the phase shift pattern may be [1, 1, 1, −1, −1, −1, 1, −1, −1, 1, −1], which is the first pattern of FIG. 23. Alternatively, the phase shift pattern may be one of the second to fourth patterns of FIG. 23. As described in Embodiment 1, the phase shift pattern is determined, in a state in which a PS value for the sequence for the UL signal to be mapped to an RB having the lowest RB index among the RBs is 1, by selecting each PS value to be applied to the remaining RBs among the RBs based on the PAPR and the CM.

A plurality of usable phase shift patterns may be configured for the UE with respect to the number of RBs in the interlace. The phase shift pattern used by the UE for UL signal transmission may be one of a plurality of configured phase shift patterns.

In other words, the phase shift patterns usable by the UE may be configured as phase shift patterns in which the PAPR and the CM are within a certain higher range among phase shift patterns derived when N is a prime number. The UE may transmit the UL signal based on one of the configured phase shift patterns.

As described above in relation Table 7, among the plural phase shift patterns, the pattern for the number of repetitions of the same PS value in the first phase shift pattern has a symmetric relationship with the pattern of the number of repetitions of the same PS value in the second pattern.

The UL signal may be a PUCCH as in Embodiment 1 of the present application, and the sequence for the UL signal may be a PUCCH sequence. In addition, UL signals other than the PUCCH also have advantages in the PAPR and the CM when N is a prime number. Accordingly, the UL signal may include the UL physical channel and/or signal exemplified above. For example, the UL signal may include a PRACH, a PUSCH, a DM-RS, a PT-RS, and/or an SRS.

In addition to the operation of FIG. 43, one or more of the operations described through FIGS. 1 to 42 and/or the operations described in Embodiment 1 may be additionally performed in combination. For example, the UE may perform UL LBT before transmission of the PUCCH.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 44 illustrates a communication system 1 applied to the present disclosure.

Referring to FIG. 44, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g., V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g., relay or integrated access backhaul (JAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

FIG. 45 illustrates wireless devices applicable to the present disclosure.

Referring to FIG. 45, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 44.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

FIG. 46 illustrates another example of a wireless device applied to the present disclosure. The wireless device may be implemented in various forms according to a use case/service (refer to FIG. 44).

Referring to FIG. 46, wireless devices 100 and 200 may correspond to the wireless devices 100 and 200 of FIG. 45 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 45. For example, the transceiver(s) 114 may include the one or more transceivers 106 and 206 and/or the one or more antennas 108 and 208 of FIG. 45. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 19), the vehicles (100b-1 and 100b-2 of FIG. 44), the XR device (100c of FIG. 44), the hand-held device (100d of FIG. 44), the home appliance (100e of FIG. 44), the IoT device (100f of FIG. 44), a digital broadcasting terminal, a hologram device, a public safety device, an MTC device, a medical device, a FinTech device (or a finance device), a security device, a climate/environment device, the AI server/device (400 of FIG. 44), the BSs (200 of FIG. 44), a network node, or the like. The wireless device may be mobile or fixed according to a use case/service.

In FIG. 46, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Example of Vehicle or Autonomous Driving Vehicle to which the Present Disclosure is Applied FIG. 47 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 47, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 46, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on.

The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Example of a Signal Process Circuit to which the Present Disclosure is Applied

FIG. 48 illustrates a signal process circuit for a transmission signal.

Referring to FIG. 48 a signal processing circuit 1000 may include scramblers 1010, modulators 1020, a layer mapper 1030, a precoder 1040, resource mappers 1050, and signal generators 1060. An operation/function of FIG. 48 may be performed, without being limited to, the processors 102 and 202 and/or the transceivers 106 and 206 of FIG. X1. Hardware elements of FIG. 48 may be implemented by the processors 102 and 202 and/or the transceivers 106 and 206 of FIG. X1. For example, blocks 1010 to 1060 may be implemented by the processors 102 and 202 of FIG. X1. Alternatively, the blocks 1010 to 1050 may be implemented by the processors 102 and 202 of FIG. X1 and the block 1060 may be implemented by the transceivers 106 and 206 of FIG. X1.

Codewords may be converted into radio signals via the signal processing circuit 1000 of FIG. 48. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 48. For example, the wireless devices (e.g., 100 and 200 of FIG. X1) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

As described above, the present disclosure is applicable to various wireless communication systems.

The invention claimed is:

1. A method of transmitting and receiving a signal by a user equipment (UE) in a wireless communication system, the method comprising:
   repeatedly mapping a sequence for an uplink signal to resource blocks (RBs) in an interlace; and
   transmitting the uplink signal on the interlace,
   wherein a number of the RBs constituting the interlace is a prime number,
   wherein the sequence for the uplink signal is repeatedly mapped based on a phase shift pattern, and
   wherein the phase shift pattern is a pattern of phase shift (PS) values for the RBs.

2. The method of claim 1, wherein the phase shift pattern is determined, in a state in which a PS value for a sequence to be mapped to an RB having a lowest RB index among the RBs is 1, by selecting each PS value to be applied to remaining RBs among the RBs based on a peak-to-average power ratio (PAPR) and a cubic metric (CM).

3. The method of claim 1,
   wherein the phase shift pattern is one of a plurality of usable phase shift patterns, and
   wherein, among the plurality of the usable phase shift patterns, a pattern for a number of repetitions of the same PS value in a first phase shift pattern has a symmetric relationship with a pattern for the number of repetitions of the same PS value in a second pattern.

4. The method of claim 1, wherein the uplink signal includes a physical random access channel (PRACH), a physical uplink control channel (PUCCH), a physical uplink shared channel (PUSCH), a demodulation reference signal (DM-RS), a phase tracking reference signal (PT-RS), and/or a sounding reference signal (SRS).

5. A user equipment (UE) for transmitting and receiving a signal in a wireless communication system, the UE comprising:
   at least one transceiver;
   at least one processor; and
   at least one memory operably connected to the at least one processor and configured to store instructions for causing, when executed, the at least one processor to perform a specific operation,
   wherein the specific operation includes
   repeatedly mapping a sequence for an uplink signal to resource blocks (RBs) in an interlace, and
   transmitting the uplink signal on the interlace, and
   wherein a number of the RBs constituting the interlace is a prime number,
   wherein the sequence for the uplink signal is repeatedly mapped based on a phase shift pattern, and
   wherein the phase shift pattern is a pattern of phase shift (PS) values for the RBs.

6. The UE of claim 5, wherein the phase shift pattern is determined, in a state in which a PS value for a sequence to be mapped to an RB having a lowest RB index among the RBs is 1, by selecting each PS value to be applied to remaining RBs among the RBs based on a peak-to-average power ratio (PAPR) and a cubic metric (CM).

7. The UE of claim 5,
   wherein the phase shift pattern is one of a plurality of usable phase shift patterns, and
   wherein, among the plurality of the usable phase shift patterns, a pattern for a number of repetitions of the same PS value in a first phase shift pattern has a symmetric relationship with a pattern for the number of repetitions of the same PS value in a second pattern.

8. The UE of claim 5, wherein the uplink signal includes a physical random access channel (PRACH), a physical uplink control channel (PUCCH), a physical uplink shared channel (PUSCH), a demodulation reference signal (DM-RS), a phase tracking reference signal (PT-RS), and/or a sounding reference signal (SRS).

9. An apparatus for a user equipment (UE), the apparatus comprising:
   at least one processor; and
   at least one computer memory operably connected to the at least one processor and configured to cause, when executed, the at least one processor to perform an operation,
   wherein the operation includes
   repeatedly mapping a sequence for an uplink signal to resource blocks (RBs) in an interlace, and
   transmitting the uplink signal on the interlace, and
   wherein a number of the RBs constituting the interlace is a prime number,
   wherein the sequence for the uplink signal is repeatedly mapped based on a phase shift pattern, and
   wherein the phase shift pattern is a pattern of phase shift (PS) values for the RBs.

10. The apparatus of claim 9, wherein the phase shift pattern is determined, in a state in which a PS value for a sequence to be mapped to an RB having a lowest RB index among the RBs is 1, by selecting each PS value to be applied to remaining RBs among the RBs based on a peak-to-average power ratio (PAPR) and a cubic metric (CM).

11. The apparatus of claim 9,
   wherein the phase shift pattern is one of a plurality of usable phase shift patterns, and
   wherein, among the plurality of the usable phase shift patterns, a pattern for a number of repetitions of the same PS value in a first phase shift pattern has a symmetric relationship with a pattern for the number of repetitions of the same PS value in a second pattern.

12. The apparatus of claim 9, wherein the uplink signal includes a physical random access channel (PRACH), a physical uplink control channel (PUCCH), a physical uplink shared channel (PUSCH), a demodulation reference signal (DM-RS), a phase tracking reference signal (PT-RS), and/or a sounding reference signal (SRS).

* * * * *